INVENTOR
CECIL JOHN WAYMAN
BY Kurtz, Kurtz & Ottinger
ATTORNEYS

ARRANGEMENTS FOR PROVIDING A REPRESENTATION IN DIGITAL FORM OF THE RELATIVE POSITION OF A PAIR OF RELATIVELY MOVABLE MEMBERS

Filed Jan. 11, 1960 10 Sheets-Sheet 2

INVENTOR
CECIL JOHN WAYMAN
BY Kurchhofer, Kurchhofer and Ettinger
ATTORNEYS

July 27, 1965 C. J. WAYMAN 3,197,758

ARRANGEMENTS FOR PROVIDING A REPRESENTATION IN
DIGITAL FORM OF THE RELATIVE POSITION OF
A PAIR OF RELATIVELY MOVABLE MEMBERS

Filed Jan. 11, 1960 10 Sheets-Sheet 3

INVENTOR
CECIL JOHN WAYMAN
BY Kirschstein, Kirschstein & Ottinger
ATTORNEYS

July 27, 1965 C. J. WAYMAN 3,197,758

ARRANGEMENTS FOR PROVIDING A REPRESENTATION IN DIGITAL FORM OF THE RELATIVE POSITION OF A PAIR OF RELATIVELY MOVABLE MEMBERS

Filed Jan. 11, 1960 10 Sheets-Sheet 4

INVENTOR
Cecil John Wayman
BY Kurchhofer, Kurchhofer & Ottinger
ATTORNEYS

INVENTOR
CECIL JOHN WAYMAN
BY Kurschner, Kurschner & Ottinger
ATTORNEYS

INVENTOR
Cecil John Wayman
BY Kirschstein, Kirschstein & Ottinger
ATTORNEYS

INVENTOR
Cecil John Wayman
BY Kirschstein, Kirschstein & Ottinger
ATTORNEYS

INVENTOR
CECIL JOHN WAYMAN
BY Kirschstein, Kirschstein & Ottinger
ATTORNEYS

July 27, 1965 C. J. WAYMAN 3,197,758

ARRANGEMENTS FOR PROVIDING A REPRESENTATION IN DIGITAL FORM OF THE RELATIVE POSITION OF A PAIR OF RELATIVELY MOVABLE MEMBERS

Filed Jan. 11, 1960 10 Sheets-Sheet 9

INVENTOR
Cecil John Wayman
BY Kirschstein, Kirschstein & Ottinger
ATTORNEYS

INVENTOR
Cecil John Wayman
BY Kirschstein, Kirschstein & Ottinger
ATTORNEYS

United States Patent Office 3,197,758

Patented July 27, 1965

3,197,758

ARRANGEMENTS FOR PROVIDING A REPRESENTATION IN DIGITAL FORM OF THE RELATIVE POSITION OF A PAIR OF RELATIVELY MOVABLE MEMBERS

Cecil John Wayman, Stanmore, England, assignor to The General Electric Company Limited, London, England Filed Jan. 11, 1960, Ser. No. 1,615
Claims priority, application Great Britain, Jan. 12, 1959, 1,051/59
The portion of the term of the patent subsequent to Nov. 27, 1979, has been disclaimed
7 Claims. (Cl. 340—347)

This invention relates to arrangements for providing a representation in digital form of the relative position of a pair of relatively movable members.

It is an object of the present invention to provide an improved form of such an arrangement.

According to the present invention, in an arrangement for providing a representation in digital form of the relative position of a pair of relatively movable members according to a predetermined code, coding means is arranged to provide either of two different digital representations of the relative position of the members at least when that relative position is in the region of a relative position for which according to said code there is to be a change in the digital representation provided by that coding means, the arrangement being such that in said region the coding means provides one or the other of those two digital representations in dependence upon the actual relative position of the two members whereby the said two different digital representations are provided by the arrangement for relative positions of the pair of members in said region on respective opposite sides of that relative position for which there is to be said change.

The present invention is particularly, though not exclusively, applicable to arrangements for providing a representation in digital form of the relative position of a pair of relatively movable members, wherein coding means is arranged to provide that digital representation in dependence upon the relative position of two portions of that coding means, one of these two portions being mechanically coupled to one of said pair of members in a manner such as to provide for relative movement between those two portions for any relative movement between said pair of members. In previously proposed arrangements of this kind imperfections in the mechanical coupling between said one portion of the coding means and said one of the pair of members, or inaccuracies in the coding means itself have been found sufficient to result in substantial errors in the digital representation.

For example it has been proposed previously to provide a representation in digital form of the angular position of a first shaft by coupling that shaft to a second shaft that forms part of an electrical coder. The two shafts are coupled together through a pair of gear wheels and electric output signals from the coder are at all times characteristic of the angular position of the second shaft. Thus theoretically these output signals are also characteristic of the angular position of the first shaft according to a predetermined code; unfortunately however, the angular position of the second shaft may not be always in correspondence with that of the first shaft. Such a situation may arise, for example, owing to back-lash between the gear wheels coupling the two shafts, and this results in a possibility of error in the output from the coder when taken as representing the actual angular position of the first shaft.

Such an error is most likely to occur when there is an angular displacement of the first shaft for which, according to said code, there is to be a change in the digital representation provided by that coder. During such an angular displacement the resulting angular displacement of the second shaft may lag behind that of the first shaft (so that the two shafts are not then in correspondence) owing to back-lash between the gear wheels. With such a lag the required change in the digital representation does not occur until after the time when (according to the actual angular position of the first shaft) it should occur, and during the interim period the output signals from the coder do not accurately represent the angular position of the first shaft.

In addition to back-lash other imperfections in the gearing and also inaccuracies in the coder itself, may result in similar incorrect representation of the angular position of the first shaft.

Thus there is the disadvantage with this previously proposed arrangement that the digital representation provided by that arrangement does not always correctly represent the angular position of the first shaft according to the predetermined code. This disadvantage may be overcome with an arrangement according to the present invention.

In this case the coding means, in accordance with the present invention, is arranged to provide either of two different digital representations of the angular position of the first shaft when that angular position is in the region of an angular position for which according to the code there is to be a change in the digital representation provided by that coding means, the arrangement being such that in this region the coding means provides one or the other of those two digital representations in dependence upon the actual angular position of the first shaft whereby those two different digital representations are provided by the arrangement for angular positions of that shaft on respectively opposite sides of that angular position for which there is to be said change.

In an arrangement according to the present invention further coding means may be arranged to provide a representation in digital form of the relative position of said pair of members, it being arranged that digits of this representation and the digits of the representation provided by the first-mentioned coding means are, respectively, lesser and more significant digits of a multi-digit number which is characteristic of the relative position of said pair of members according to said code, and that when the relative position of said pair of members is in said region said first-mentioned coding means provides one or the other of said two digital representations in dependence upon the actual relative position of the two members as this is represented by the digital representation then provided by said further coding means.

The multi-digit number may be an $(m+n)$ digit binary number (where $m$ and $n$ which may be equal, are both integers greater than unity), the digital representation provided by said further coding means being representative of the $(n+1)$ least significant binary digits of said $(m+n)$ digit number, and it may then be arranged that there is a change in the digital representation provided by said first-mentioned coding means, which representation is representative of the $m$ most significant binary digits of the $(m+n)$ digit number, only when there is a change in the most significant binary digit represented by said further coding means.

Arrangements according to the present invention for providing an electrical representation of a binary number characteristic of the angular position of a shaft, will now be described, by way of example, with reference to the accompanying drawings, in which.

Figure 1:
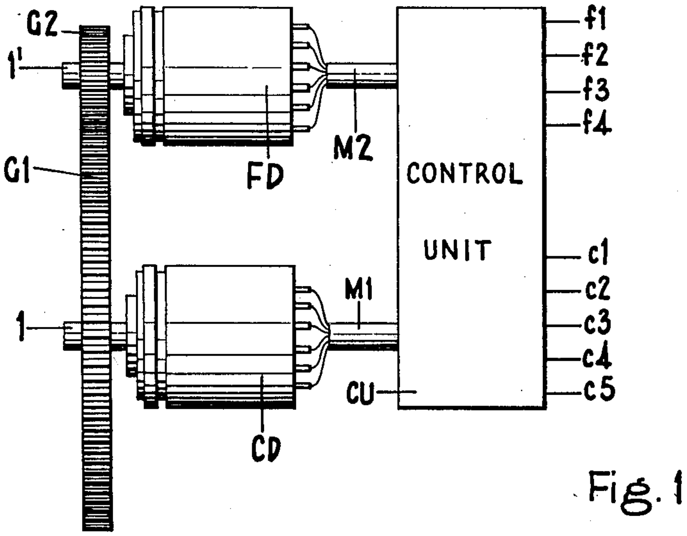
FIGURE 1 shows one of the arrangements.
Figure 9:
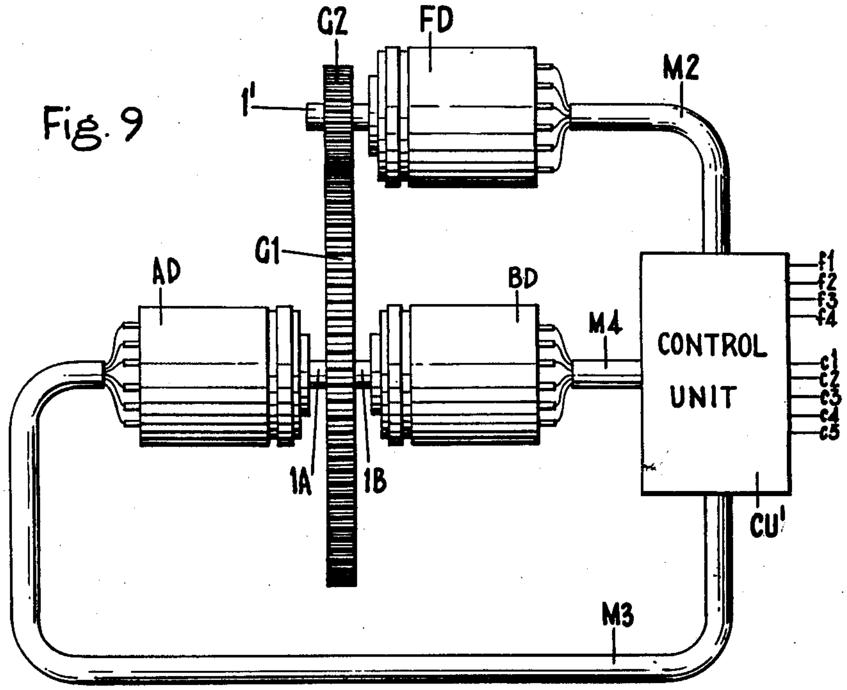
Figure 2:
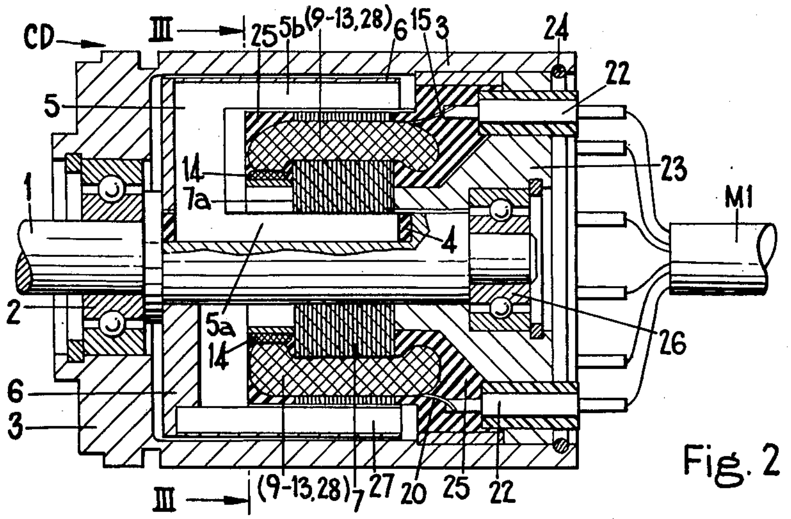
FIGURE 2 is a sectional elevation of one of two coders of the arrangement shown in FIGURE 1.
Figure 4A:
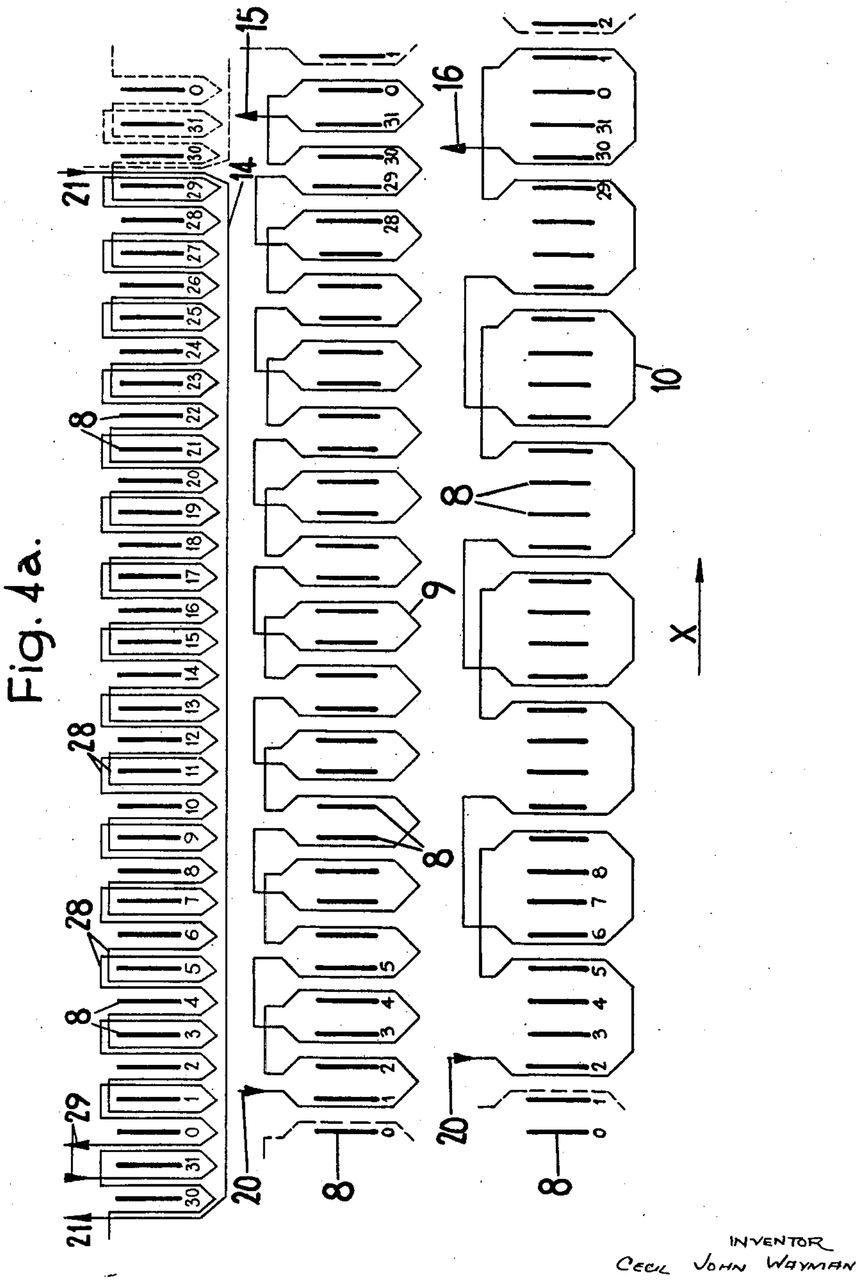
Figure 4B:
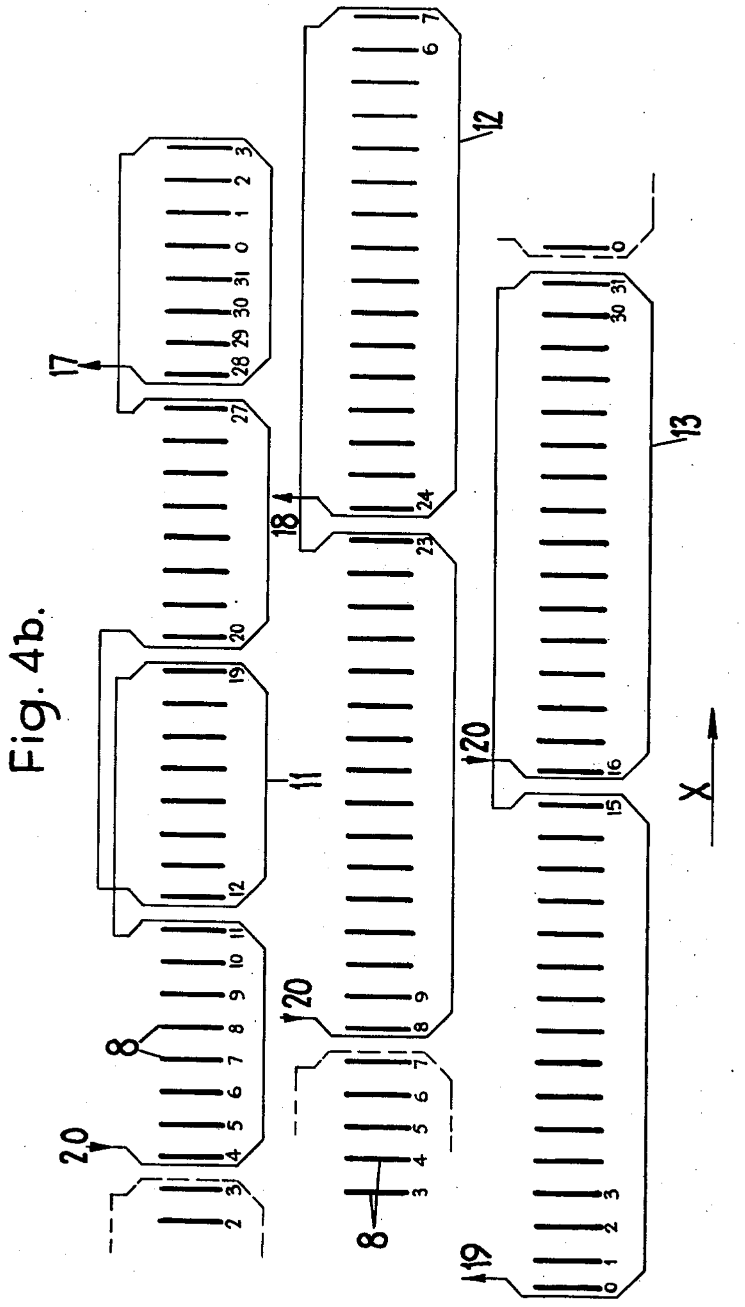
Figure 5:
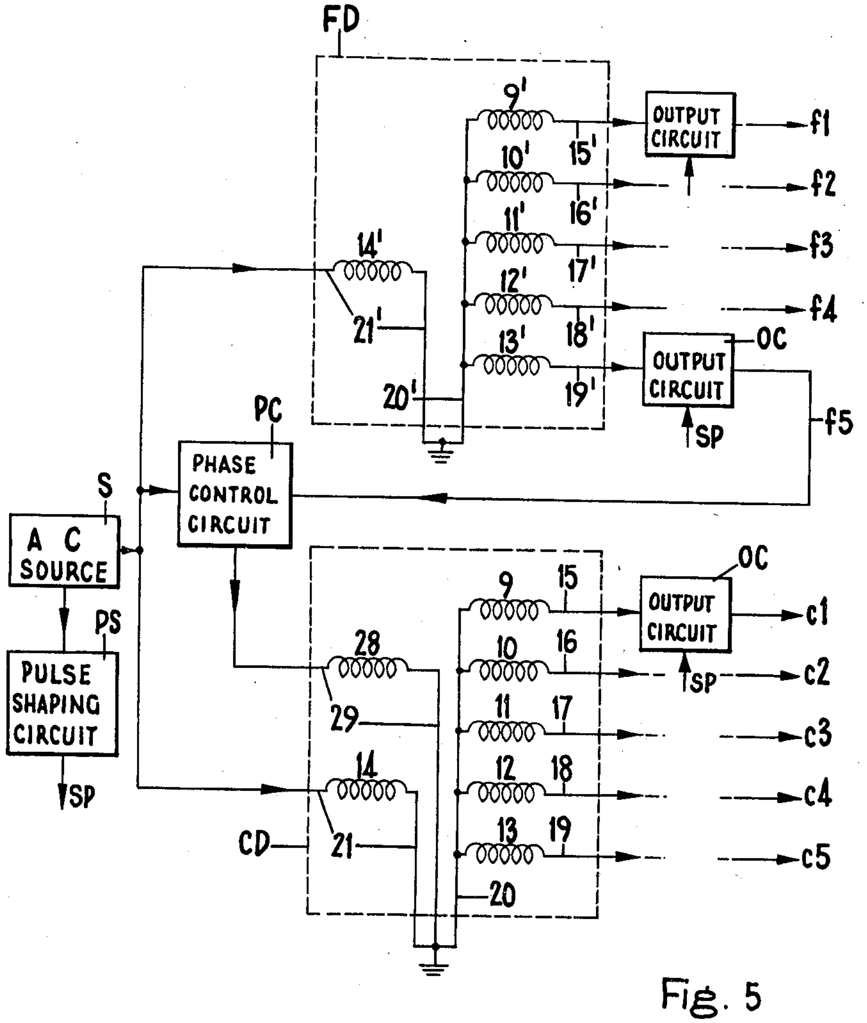
Figure 6:
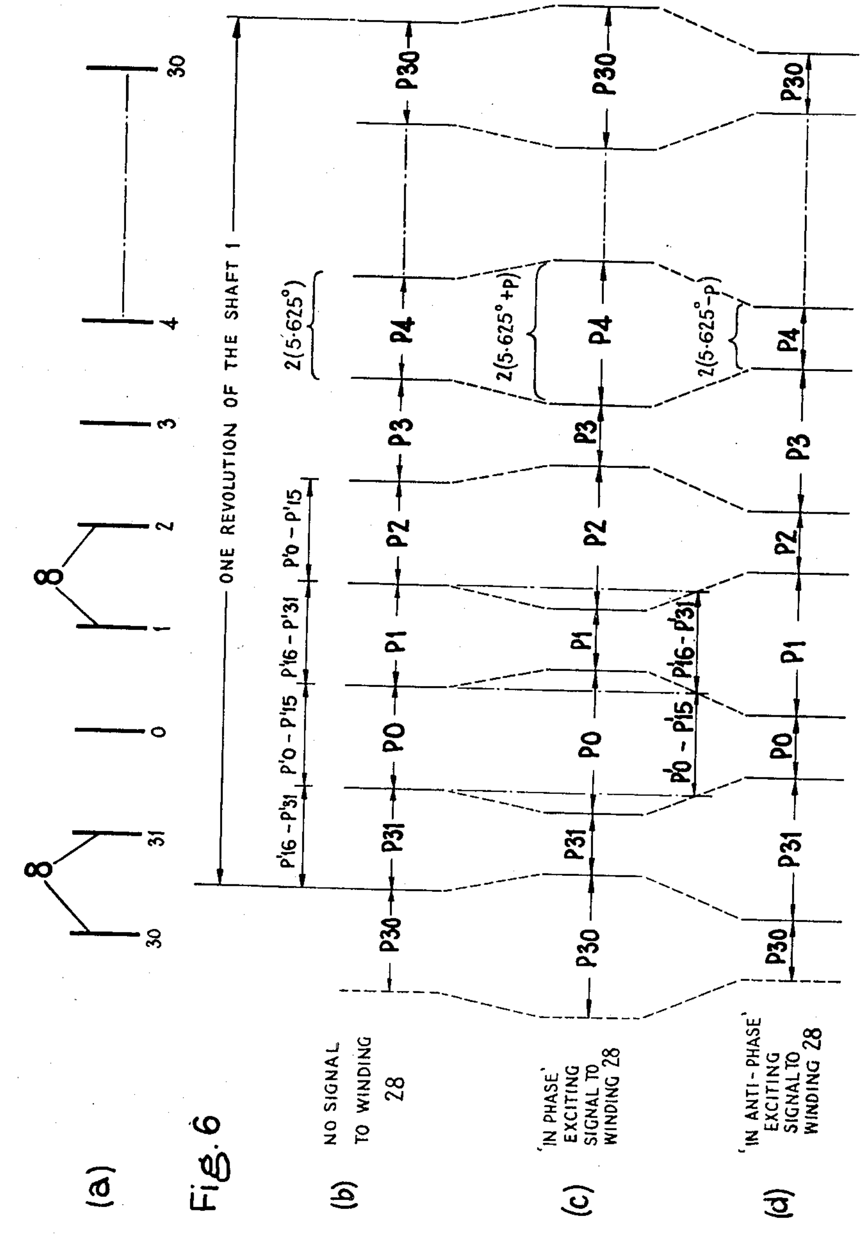
Figure 7:
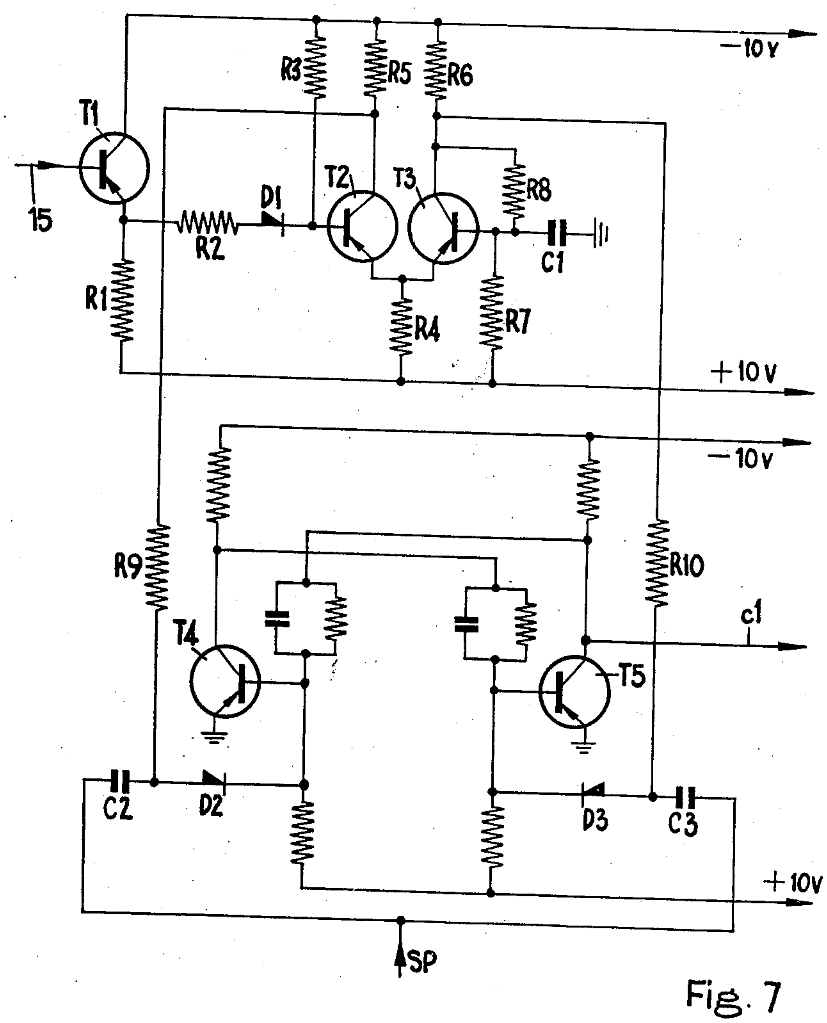
Figures 8, 11:
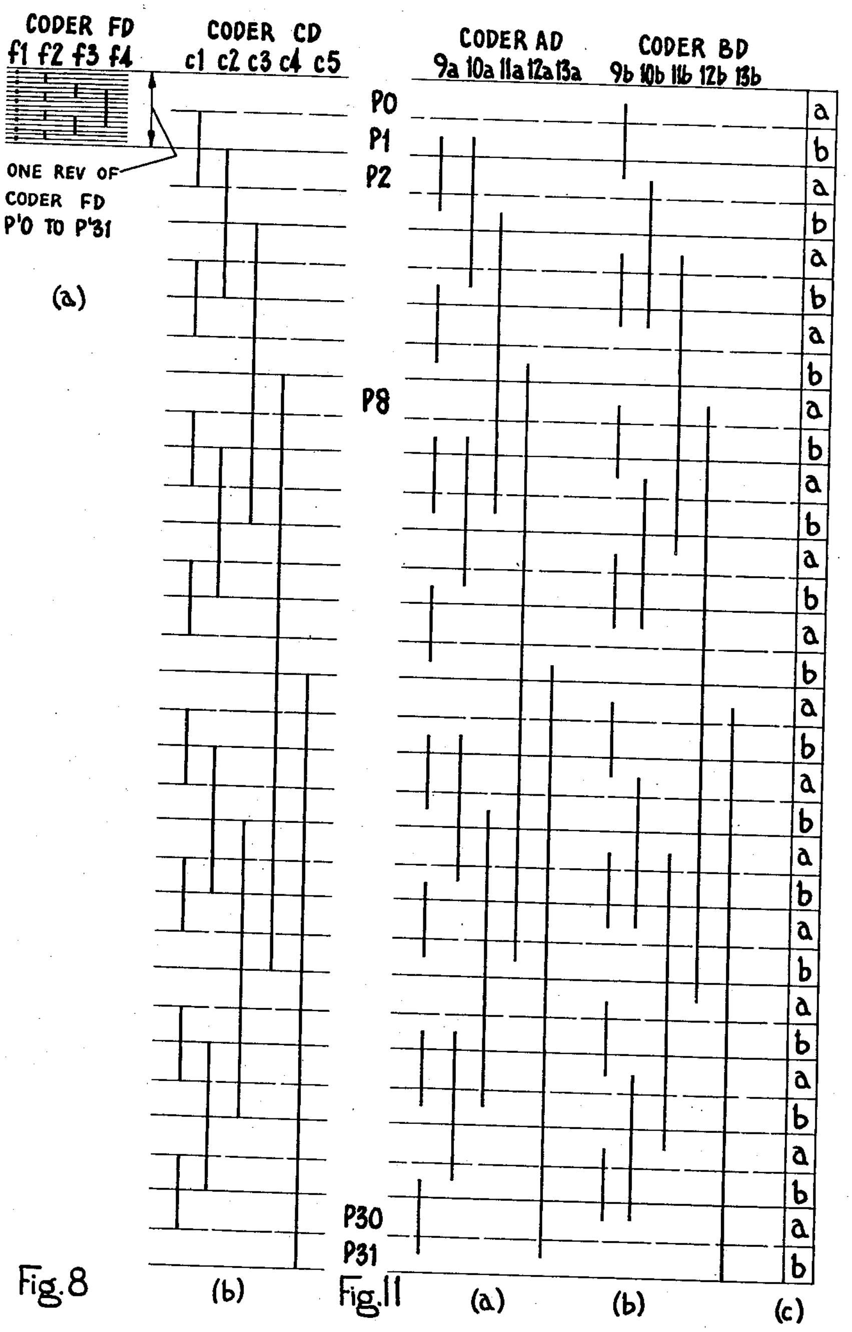
Figure 10:
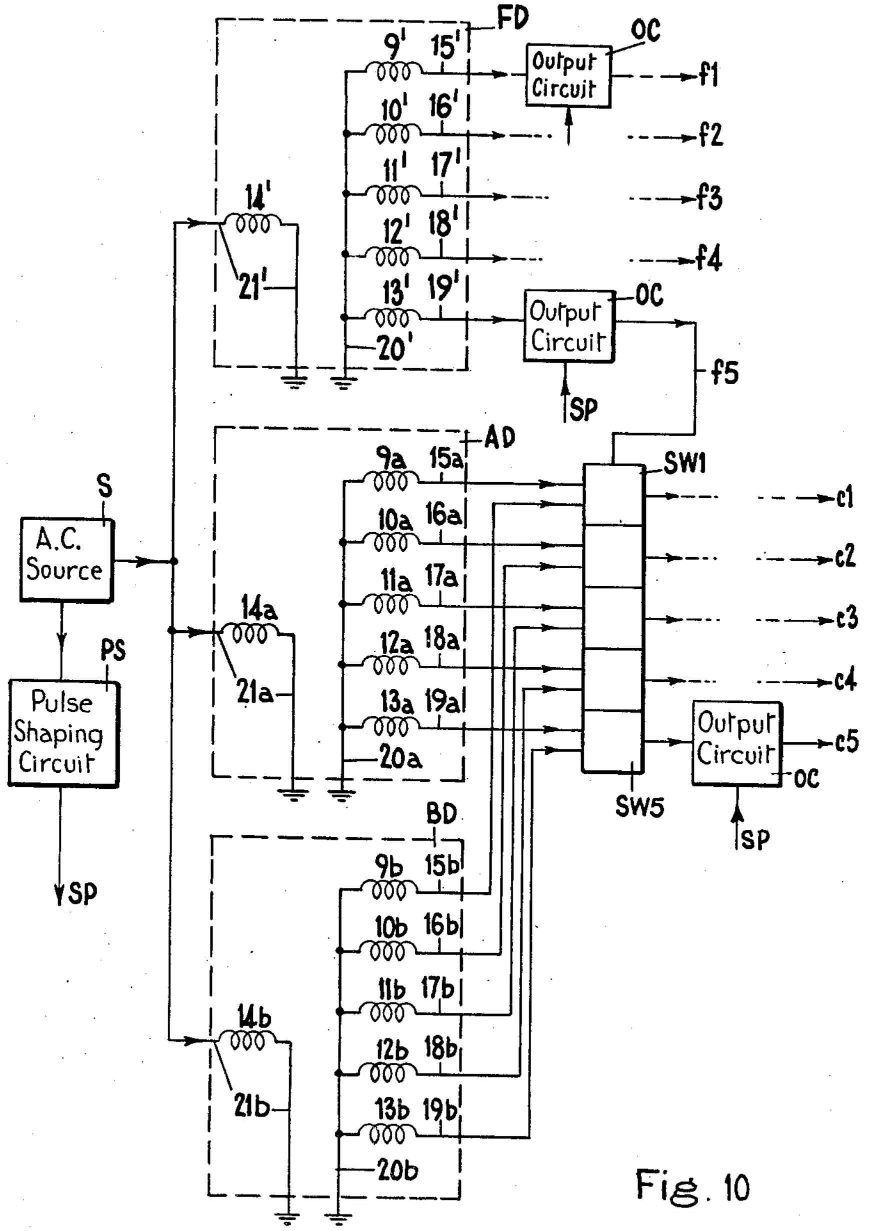
Figures 12, 13:
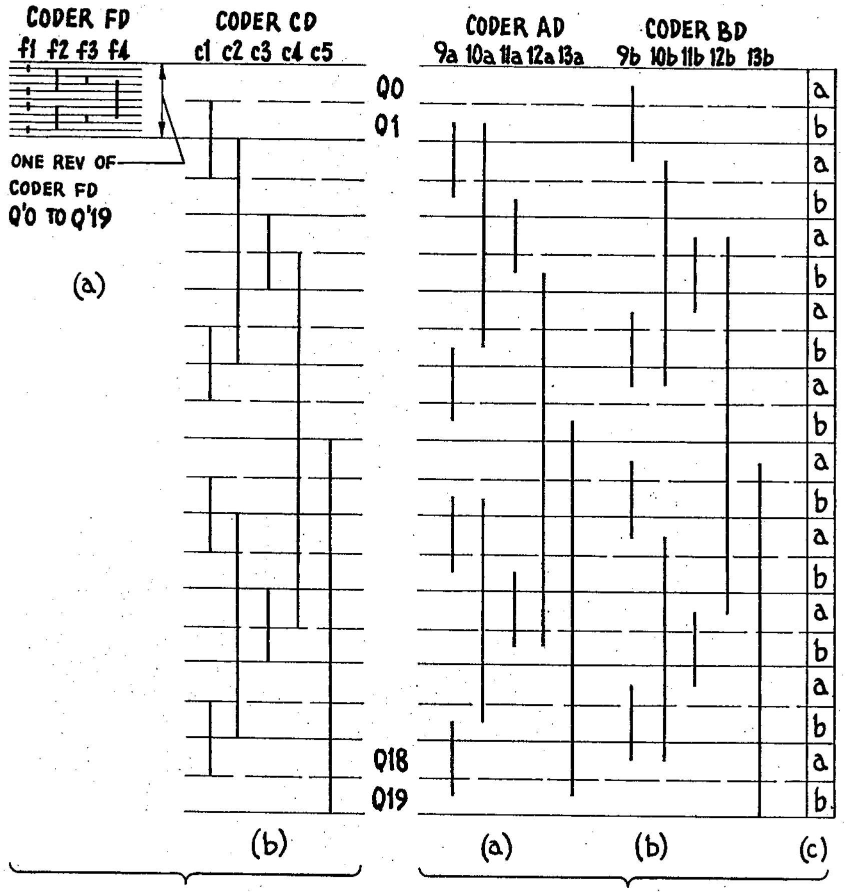

FIGURES 4*a* and 4*b* are diagrammatic representations of the arrangement of electrical windings in the coder shown in FIGURE 2;

FIGURE 5 is a schematic representation of the electrical circuit of the arrangement shown in FIGURE 1;

FIGURE 6 show diagrammatically the relationship between various angular ranges of the shaft of the coder shown in FIGURE 2, for three conditions of operation of that coder;

FIGURE 7 is a circuit diagram of one of ten output circuits which form part of the arrangement of FIGURE 1, this output circuit being represented in FIGURE 5 in schematic form only;

FIGURE 8 is a diagrammatic representation of the binary code according to which the angular position of a shaft is represented by the arrangement shown in FIGURE 1;

FIGURE 9 shows another arrangement according to the present invention;

FIGURE 10 is a schematic representation of the electrical circuit of the arrangement shown in FIGURE 9;

FIGURE 11 is a diagrammatic representation of two binary codes according to which the angular position of the same shaft is represented by two coders respectively of the arrangement shown in FIGURE 9;

FIGURE 12 is a diagrammatic representation of an alternative binary code which may be used in the arrangement shown in FIGURE 1; and FIGURE 13 is a diagrammatic representation of an alternative pair of binary codes which may be used in the arrangement shown in FIGURE 9.

Referring to FIGURE 1, the angular position of an input shaft 1' is represented by this arrangement as a nine digit binary number, and this number is characteristic of that angular position within sixteen complete revolutions of the shaft 1'. The shaft 1' is, in fact, part of a coder FD and, during use of the arrangement, is connected to a device for rotating that shaft. A shaft 1 of a coder CD is coupled to the shaft 1' by means of intermeshing gear wheels G1 and G2 secured to the shafts 1 and 1' respectively. Electrical connection is made between each of the coders CD and FD and a control unit CU by means of respective multi-lead cables M1 and M2.

The control unit CU has nine output leads *f*1 to *f*4 and *c*1 to *c*5, and pulses representative of the nine digits of the binary number then characteristic of the angular position of the shaft 1', appear on respective output leads *f*1 to *f*4 and *c*1 to *c*5. Pulses representative of the four least significant digits appear, in ascending order of significance, on the leads *f*1 to *f*4 respectively, and pulses representative of the five most signficant digits appear, in ascending order of significance, on the leads *c*1 to *c*5 respectively.

In operation an alternating current exciting signal is applied from the control unit CU to the coder CD over a pair of the leads within the cable M1. As a result of this exciting signal five alternating current signals are applied from the coder CD over respective leads of the cable M1, to the control unit CU. The coder CD is such that each of these alternating current signals is either in-phase or in anti-phase with the exciting signal, the particular combination of signals which are in-phase (and consequently the particular combination of signals which are in anti-phase) being characteristic of the angular position of the shaft 1 within one revolution.

Similarly, the alternating current exciting signal is applied from the control unit CU to the coder FD over a pair of the leads within the cable M2. The coder FD is similar in basic construction to the coder CD, so that a combination of five alternating current signals which are either in-phase or in anti-phase with the exciting signal, is applied from the coder FD to the control unit CU. The particular combination of signals which are in-phase (and consequently the particular combination of signals which are in anti-phase) is likewise, characteristic of the angular position of the shaft 1'.

The control unit CU is so arranged that pulses appear on the output leads *c*1 to *c*5 in dependence upon respective ones of the five signals applied to that unit from the coder CD, and also such that pulses appear on the output leads *f*1 to *f*4 in dependence upon respective ones of four of the five signals applied to that unit from the coder FD. A pulse appears on any one of the nine leads *c*1 to *c*5 and *f*1 to *f*4 only while the respective one of the nine signals from the coders CD and FD is in a particular one of the two possible phase relationships, in-phase and in anti-phase, with the exciting signal.

A pulse signal is also derived within the control unit CU from the other signal, the fifth, applied from the coder FD. In fact, as in the case of the other four signals from the coder FD, this pulse signal is derived in dependence upon the phase relationship between the fifth signal and the exciting signal and this pulse signal is used within the unit CU to control the application of a further signal to the coder CD over a further pair of the leads within the cable M1.

This further signal applied to the coder CD is the same as the exciting signal except that it is either in-phase or in anti-phase with the exciting signal in dependence upon the controlling pulse signal. It is arranged that if the fifth signal of the five signals applied from the coder FD to the control unit CU, is in a first of the two possible phase relationships with the exciting signal, then the further signal is applied to the coder CD to be in-phase with the exciting signal, but if that fifth signal is in the other phase relationship, then that further signal is applied to be in anti-phase with the exciting signal.

The effect of the application of the further signal to the coder CD is to modify the coding according to which the angular position of the shaft 1 would ordinarily be represented by that coder. With the coding that would ordinarily be provided by the coder CD the complete revolution of the shaft 1 is divided into thirty-two angular ranges of equal magnitude, but when the further signal is applied to that coder this coding is modified so that the complete revolution is then divided into alternate ranges of large and small magnitude. The particular one of two systems of large and small ranges that exists at any time is dependent upon the phase of said further signal at that time.

The resulting combination of pulses appearing on the output leads *f*1 to *f*4 and *c*1 to *c*5, is representative of the angular position of the shaft 1' according to a single nine digit binary code. In accordance with this code the sixteen complete revolutions of the shaft 1' are divided into thirty-two half revolutions, and each of these half revolutions into sixteen equal angular ranges. The five most significant digits of the represented nine digit binary number indicate in which of the thirty-two half revolutions the shaft 1' is then positioned, whilst the four least significant digits indicate within which of the sixteen angular ranges of that half revolution the shaft 1' actually lies.

Although the shaft 1 is geared to the shaft 1' through the gear wheels G1 and G2, the angular position of the shaft 1 may not be in direct correspondence with that of the shaft 1' owing to imperfections in the gearing such as, for example, back-lash between those gear wheels. The angular position of the shaft 1 therefore does not provide an accurate representation to the coder CD of the position of the shaft 1' from which the five most significant digits of the nine digit number may be derived directly by that coder in the ordinary manner. In general however, this inaccuracy is of importance only when the angular position of the shaft 1' is changed, or is about to be changed, from one to another of the thirty-two half revolutions. Such a change in angular position of the shaft 1' is to be accompanied according to the nine digit binary code by a change in one of the five most significant digits, and it is essential that this should in fact be obtained in practice irrespective of the imperfections in the gearing and in the coder CD itself.

The desired result is obtained in the present case by arranging that the change in phase of the fifth signal applied to the control unit CU from the coder FD occurs only when the angular position of the shaft 1' itself is changed from one to the next of the thirty-two half revolutions. It is this change in phase which is used to effect the required change in the five most significant digits by effecting a change in the system of alternate large and small angular ranges that then prevails in the coder CD. The two systems of large and small angular ranges in the coder CD are so chosen that even for the maximum effect of imperfections in the gearing and inaccuracies in the coder CD, there is no change in the pulse combination appearing on the leads c1 to c5 until there is a change in phase of the fifth signal from the coder FD. This change in phase of the fifth signal causes the system according to which the angular position of the shaft 1 is then being represented by the coder CD, to be changed, and this change results in a change in the pulse combination appearing on the leads c1 to c5. Since the change in phase of the fifth signal from the coder FD takes place only at the time when, according to the actual angular position of the shaft 1' and the nine digit binary code, there should be a change in the five most significant digits, the nine digit binary number represented by the pulse combination appearing on the leads c1 to c5 and f1 to f4 provides an accurate indication of the angular position of the shaft 1'. This is so in spite of the fact that part of this pulse combination is derived in dependence upon the angular position of the shaft 1 of the coder CD.

The construction of the coder CD will now be described with reference to FIGURES 2 and 3.

Figure 3:
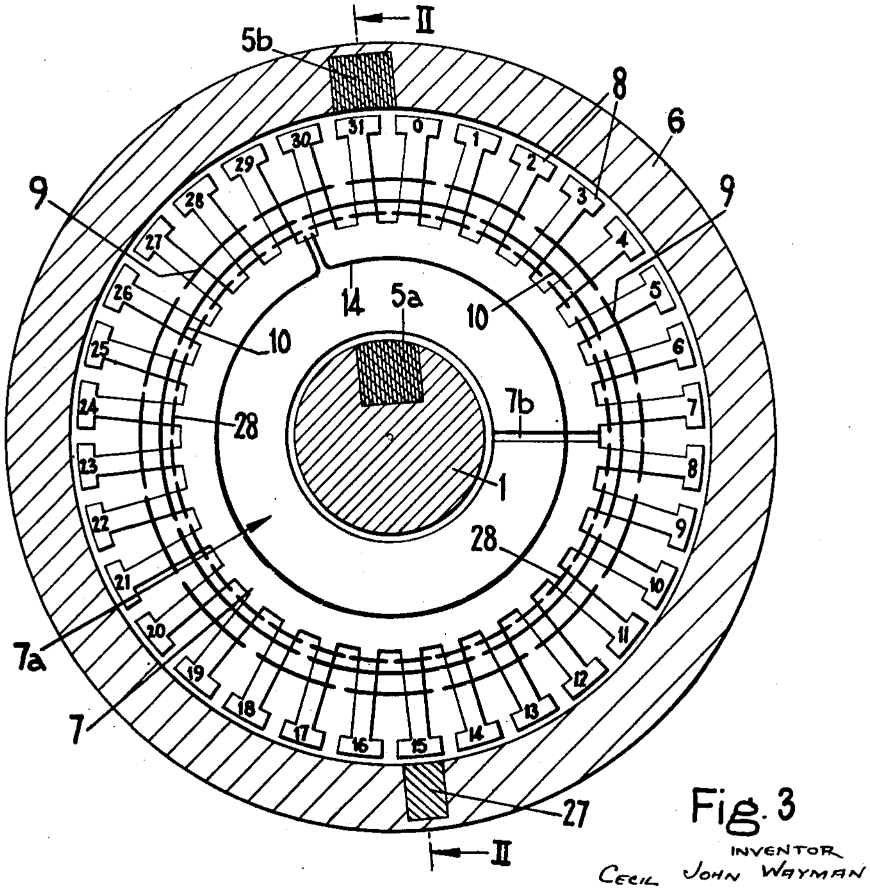
FIGURE 3 is an enlarged diagrammatic representation of a section taken on the line III—III of FIGURE 2, the section of FIGURE 2 being taken on the line II—II of FIGURE 3.

Referring to FIGURES 2 and 3, the shaft 1 is journalled within a bearing 2 housed in a casing 3. The shaft 1 has a channel 4 therein and one limb 5*a* of a laminated ferromagnetic yoke 5 is secured within this channel. Another limb 5*b*, together with the remainder of the yoke 5, is secured within a cylindrical member 6 which rotates with the shaft 1.

A laminated ferromagnetic core 7 is supported within the casing 3, the core 7 having thirty-two teeth 8 (which are numbered 0 to 31 in FIGURE 3). The pitch of the teeth 8 is substantially the same as the thickness of the yoke 5, and the core 7 is composed of seventy laminations. These laminations have respective radial slits 7*b* that are arranged so that throughout the length of the core 7 there is a uniform angular distribution of these slits about the axis of that core.

Five windings 9 to 13 together with a winding 28, are wound to lie between adjacent ones of the teeth 8 and over the ends of those teeth at an end 7*a* of the core 7. The windings 9 to 13 and 28 have the general reference (9–13, 28) in FIGURE 2, and of these only the windings 9, 10 and 28 are shown in FIGURE 3.

Connection is made to the windings 9 to 13 by respective leads 15 to 19 (of which only the lead 15 is shown in FIGURE 2) and a common lead 20, and to the windings 14 and 28 by respective pairs of leads 21 and 29 (not shown in FIGURE 2). The leads 15 to 21 and 29 are connected within the coder CD to respective ones of ten terminal pins 22 which extend from the inside to the outside of that coder. Ten separate leads of the multilead cable M1 are connected to the respective pins 22 on the outside of the coder CD.

The core 7 is supported within the casing 3 by means of an end-member 23 which is secured within the casing by a spring clip 24. The core 7 is in actual fact bonded to the end-member 23 by a resin 25 (such as one of those sold under the registered trademark "Araldite") within which the core 7 and the member 23 are encased during manufacture. The shaft 1 is journalled within a bearing 26 in the member 23.

A lead weight 27 is secured within the member 6 diametrically opposite the limb 5*b* of the yoke 5, in order to counteract unbalance of the shaft 1 caused by the unsymmetrical positioning of the yoke 5 within the member 6.

The manner in which the windings 9 to 13, 14 and 28, are wound on the core 7 is indicated diagrammatically in FIGURES 4*a* and 4*b* to which reference will now be made. In these figures the teeth 8 are numbered from 0 to 31 in the same manner as in FIGURE 3.

Referring to FIGURES 4*a* and 4*b*, the winding 9 is wound round pairs of the teeth 8; the winding 10 is wound round groups of four of the teeth 8; the winding 11 is wound round groups of eight of the teeth 8; and the windings 12 and 13 are wound round different groups of sixteen of the teeth 8.

The winding 14, as also indicated in FIGURE 3, is effectively wound round all the teeth 8 together, whereas the winding 28 is wound round each of the teeth 8 individually.

The sense in which each of the windings 9 to 13 and 28 is wound onto the core 7 is alternated. For example, the sense in which the winding 9 is wound round Nos. 1 and 2 of the teeth 8 is opposite to that in which it is wound round Nos. 3 and 4 of the teeth 8, but is the same as that in which it is wound round Nos. 5 and 6 of those teeth. In addition, the sense in which the winding 11 is wound round Nos. 4 to 11 of the teeth 8 is opposite to that in which it is wound round Nos. 12 to 19 of the teeth 8 but is the same as that in which it is wound round Nos. 20 to 27. Further, the sense in which the winding 28 is wound round the "odd" Nos. 1, 3 . . . , 29, and 31, of the teeth 8 is opposite to that in which this winding is wound round the "even" Nos. 0, 2 . . . , 28 and 30, of those teeth.

It will be assumed for the purposes of the present description that the sense in which a winding is wound are "positive" and "negative" where that winding (as represented in FIGURE 4*a* or 4*b*) is wound round teeth 8 in anti-clockwise and clockwise directions respectively. In these circumstances therefore, a winding is wound in the "positive" sense where the direction in which that winding is wound over the ends of the teeth 8 at the end 7*a* is as indicated by the arrows X, whereas that winding is wound in the "negative" sense where wound in the opposite direction at the end 7*a*. The directions in which the windings are wound are indicated in FIGURES 4*a* and 4*b* by the arrows at the two ends of those respective windings. For example, the winding 9 is wound over Nos. 1 and 2 and Nos. 5 and 6 of the teeth 8 in the positive sense, but in the negative sense over Nos. 3 and 4 of the teeth 8.

Although each of the windings 9 to 14 and 28 is represented in FIGURES 4*a* and 4*b* as a single turn, each of the windings 9 to 13 in actual fact comprises twenty-five turns, and the windings 14 and 28, fifty turns.

The construction of the coder FD is exactly the same as that of the coder CD so that the shaft 1' (of FIGURE 1) corresponds to the shaft 1 of FIGURES 2 and 3. However the coder FD does not necessarily include a winding corresponding to the winding 28 or leads corresponding to the leads 29 connected to that winding, because, as will appear later, no such winding is used in the coder FD. The windings in the coder FD which correspond to the windings 9 to 14 of the coder CD, and the leads, corresponding to the leads 15 to 21, connected to those windings, are referred to hereinafter as the windings 9' to 14', and the leads 15' to 21', respectively.

Reference will now be made to FIGURE 5 which represents in block schematic form the control unit CU, and the manner in which this unit is connected to the coders CD and FD.

Referring to FIGURE 5, the alternating current exciting signal, which signal has a frequency of 25 kilocycles per second, is applied to the winding 14 of the coder CD, from a source S. This exciting signal is correspondingly applied to the winding 14′ of the coder FD, and is also applied through a phase control circuit PC to the winding 28 of the coder CD.

The lead 20 of the coder CD and the lead 20′ of the coder FD are both connected directly to earth, and the ten leads 15 to 19 and 15′ to 19′ are connected to ten output circuits OC respectively (of which only three are shown).

The leads $f1$ to $f4$ constitute the output leads of the output circuits OC connected to the leads 15′ to 18′, respectively, and the leads $c1$ to $c5$ constitute the output leads of the output circuits OC connected to the leads 15 to 19 respectively. The output circuit OC connected to the lead 19′ of the coder FD, has an output lead $f5$ which is connected, within the control unit CU, to the phase control circuit PC.

The exciting signal is also applied from the source S to a pulse shaping circuit PS, and an output lead SP from this circuit PS is connected to each of the output circuits OC (the complete connections between the source S and the output circuits OC have been omitted for clarity).

The effect of the application of the alternating current exciting signal from the source S to the winding 14 (but not to the winding 28) of the coder CD will now be considered.

Neglecting, for the present, the effect of the yoke 5 upon the operation of the coder CD, the application of the exciting signal to the winding 14 causes alternating currents to be induced in each of the windings 9 to 13 due to normal inductive coupling between each of the windings 9 to 13 and the winding 14 at the end $7a$ of the core 7. However, as described above, the senses of the windings 9 to 13 alternate round the end $7a$ of the core 7, and for each of the windings the overall inductive coupling between that winding and the winding 14 is the same in both senses. As a result the alternating currents which are induced in each of the windings 9 to 13 in one sense, are effectively cancelled out by the alternating currents induced therein in the opposite sense, so that no voltage signal is developed between any of the leads 15 to 19, and the common lead 20.

The yoke 5 is shown in FIGS. 2 and 3 in a position relative to the core 7 in which the limb $5b$ lies over No. 31 of the teeth 8, and in this position therefore, the yoke 5 completes a magnetic circuit linking each of the windings 9 to 13 to the winding 14 where those windings 9 to 13 pass over the end of No. 31 of the teeth 8 at the end $7a$ of the core 7. This magnetic circuit passes from the limb $5a$ to the limb $5b$ in the yoke 5, and from the limb $5b$ to the limb $5a$ through that part of the laminated core 7 which lies interposed, in this position, between the limbs $5a$ and $5b$. As a result therefore, the magnitude of the inductive coupling between each of the windings 9 to 13 and the winding 14, where these windings are linked by the yoke 5, is much greater than is the case for the normal inductive coupling between those windings when not so linked. Since the windings 9 to 13 and the winding 14 are only linked by the yoke 5 in the one position, that is, where the windings 9 to 13 lie over the end of No. 31 of the teeth 8, there is increased coupling between the windings 9 to 13 and the winding 14 at this one position only. As a result, alternating voltage signals appear between each of the leads 15 to 19 and the lead 20, these signals being due solely to the additional inductive coupling between the windings 9 to 13 and the winding 14 where these windings are linked by the yoke 5.

The voltage signals appearing between the individual leads 15 to 19 and the lead 20 are in-phase or in anti-phase with the alternating current exciting signal according to the senses of the respective windings 9 to 13 where these are linked by the yoke 5.

It will be appreciated from FIGURES $4a$ and $4b$ that where the windings 9 to 13 are linked by the yoke 5 (as shown in FIGURES 2 and 3) the windings 9 to 12 are wound in the negative sense and the winding 13 is wound in the positive sense. Hence, the alternating voltage signals appearing between the individual leads 15 to 18 and the lead 20 are in anti-phase with the exciting signal in the winding 14, whereas the alternating voltage signal that appears between the leads 19 and 20 is in-phase with this exciting signal. The manner in which the windings 9 to 13 are wound over the teeth 8 is such that there is a unique combination of such "in-phase" and "in anti-phase" signals between the individual leads 15 to 19 and the lead 20, for any position of the shaft 1 relative to the casing 3. Thus, for any angular position of the shaft 1 within a range of 360 degrees, this position is indicated by the unique combination of "in-phase" and "in anti-phase" signals appearing between the leads 15 to 19 and the lead 20. With the present arrangement of windings the sense of only one of the windings 9 to 13 changes between adjacent teeth 8, so that the phase of only one output signal changes for movement of the yoke 5 between those teeth.

Since there is a change in sense of one of the windings 9 to 13 between any adjacent pair of teeth 8, the yoke 5 when positioned to lie between those two teeth links that particular winding to the winding 14 in both senses. For example, in the case of the angular position of the shaft 1 shown in FIGURES 2 and 3, the limb $5b$ of the yoke 5 lies partly between Nos. 31 and 0 of the teeth 8, so that in this position the limb $5b$ links each of the windings 9 to 13 to the winding 14 not only where these windings pass over the end of No. 31 of the teeth 8 at the end $7a$, but also to a certain extent, where these windings pass over the end of No. 0 of the teeth 8. However it is only for the winding 13 that there is a change in sense between Nos. 31 and 0 of the teeth 8. As a result the winding 13 is coupled to the winding 14 in each of two senses by the yoke 5, whereas the windings 9 to 12 are each coupled to the winding 14 in only one sense by that yoke.

The resultant signal induced in the winding 13 is either an "in-phase" signal or an "in anti-phase" signal depending upon the exact position of the yoke 5 in relation to Nos. 31 and 0 of the teeth 8. This resultant signal is of course the algebraic sum of the signals induced in the winding 13 from the portions of that winding which are wound in opposite senses round Nos. 31 and 0 of the teeth 8. It is apparent that in the case of the actual angular position of the shaft 1 shown in FIGURES 2 and 3, the magnitude of the inductive coupling between the winding 13 and the winding 14 is greater for that portion of this winding which is wound in the positive sense over the end of No. 31 of the teeth 8, than for that portion which is wound in the negative sense over the end of No. 0 of the teeth 8. Thus the resultant signal appearing between the lead 19 and the lead 20 is in this case an "in-phase" signal.

In general, therefore, there is always a signal in each of the windings 9 to 13, the particular combination of "in-phase" and "in anti-phase" signals in these windings indicating the angular position of the shaft 1.

There is of course one exception to the general proposition set out above, this being when the limb $5b$ is positioned exactly symmetrically between two adjacent teeth 8. In these circumstances there is no resultant signal in the winding which changes sense between those teeth; however, these circumstances need not affect the accuracy of the apparatus since the non-existence of a signal in that winding may be quite accurately interpreted either as an "in-phase" signal or an "in anti-phase" signal, since this position of the limb $5b$ is the position for which there is ordinarily a transition from one to the other of those "phases."

The signals appearing on the leads 15 to 19 of the coder CD are passed to the associated output circuits OC and are there in effect compared with the exciting signal applied to the winding 14. The actual manner in which this comparison is performed is described later; however, the result of the comparison is such that if the signal appearing on a lead of the leads 15 to 19 is in one of the two possible phase relationships (in-phase or in anti-phase) with the exciting signal, a pulse appears on the corresponding one of the output leads c1 to c5. If this signal is in the other of those phase relationships, no pulse appears on that output lead.

In the present case a pulse appears on any one of the output leads c1 to c5 only if an "in-phase" signal appears on the corresponding one of the leads 15 to 19.

In operation therefore, the position of the shaft 1 is indicated by means of a particular combination of pulses appearing on the output leads c1 to c5, this particular combination being unique for that particular position of the shaft 1. The appearance of a pulse on any one of the five output leads c1 to c5 may be taken as representing the binary digit "1," and the absence of such a pulse the binary digit "0," so that the different combinations of pulses are expressed as different numbers in a five digit binary code. The different digits of the binary number characteristic of the angular position of the shaft 1 at any one time, are dependent upon the presence or absence of pulses on the different output leads c1 to c5 at that time, the five digital places within this number each corresponding to a different one of the five output leads c1 to c5.

With the arrangement of windings as shown in FIGURES 4*a* and 4*b*, in which the sense of only one of the windings 9 to 13 changes between adjacent teeth 8, the angular position of the shaft 1 relative to the casing 3 is represented in a five digit reflected binary cyclic permitted code. Such a code has the advantages that for adjacent "digital" positions of the shaft 1 the binary numbers characteristic of those two positions differ only in the digit of one digital place.

A "digital" position of the shaft 1 may be defined as the small angular range of position of the shaft 1, of which a single unique binary number (in this case of five digits) is characteristic. In the present case there are thirty-two such digital positions P0 to P31, say, and the relationship between the teeth 8 and these "digital" positions in the coder CD is illustrated in FIGURE 6.

Referring to FIGURE 6, the teeth 8 are represented at *a* in a manner similar to that of FIGURES 4*a* and 4*b*, the disposition of the digital positions P0 to P31 relative to those teeth 8 while no signal is applied to the winding 28, being indicated at *b*. While no signal is applied to the winding 28, each of the digital positions P0 to P31 extends over a range of 5.625 degrees of rotation of the shaft 1 on either side of the angular position for which the limb 5*b* is situated symmetrically over the corresponding one of Nos. 0 to 31 of the teeth 8. The binary number characteristic of the position of the shaft 1 is the same for all angular positions of the shaft 1 within this range, that is, within that digital position. For example, the shaft 1 is in the digital position P31 when situated as shown in FIGURES 2 and 3, and the binary number represented by the pulses appearing on the leads c1 to c5 is the same as if the limb 5*b* was situated exactly symmetrically over No. 31 of the teeth 8, or in any other position within a range of 5.625 degrees on either side of that symmetrical position.

Referring again to FIGURE 5, the application of the exciting signal to the winding 14′ of the coder FD (as in the case of the coder CD) results in the appearance of a combination of "in-phase" and "in anti-phase" signals on the leads 15′ to 19′ of the coder FD. This combination of signals (in the same manner) provides an indication of the angular position of the shaft 1′ within a range of 360 degrees. The signals appearing on the leads 15′ to 19′ are passed to the associated output circuits OC and are there in effect compared with the exciting signal applied to the winding 14′. It is arranged (as in the case of the coder CD) that it is only when an "in-phase" signal appears on one of the leads 15′ to 19′ that a pulse appears on the associated one of the output leads f1 to f5.

Any pulse appearing on the lead f5 is applied to the phase control circuit PC to control, in effect, the phase of the exciting signal from the source S as applied to the winding 28 of the coder CD. The particular manner in which the phase of the signal as applied to the winding 28 is so controlled is described later.

As follows from the description of the operation of the coder CD and the similarity between the coders CD and FD, there are thirty-two digital positions of the shaft 1′ of the coder FD, these digital positions P′0 to P′31, say, corresponding to the digital positions P0 to P31 of the coder CD. In addition, the appearance of a pulse on any one of the leads f1 to f4 may be taken as representing the binary digit "1," and the absence of such a pulse the binary digit "0."

From reference to FIGURES 4*a* and 4*b*, and considering the output signals that appear upon the leads f1 to f4 only, the different digital positions P′0 to P′15 of the shaft 1′ over one half of the complete revolution of the shaft 1′ are represented respectively by sixteen different four digit binary numbers. The digital positions P′16 to P′31 of the shaft 1′ over the other half of the complete revolution are also represented by the same sixteen four digit binary numbers. However the sequence of sixteen four digit numbers which is obtained for the rotation of the shaft 1′ through the range of digital positions P′16 to P′31 (in that order) is the reverse of that obtained for rotation of the shaft 1′ through the range of digital positions P′0 to P′15 (in that order).

The shafts 1 and 1′ are coupled together by the gears G1 and G2, which have a gear ratio of 16:1, such that the shaft 1 rotates from one extreme to the other of one of the digital positions P0 to P31 for each complete half revolution of the shaft 1′. In fact it is arranged that the shaft 1 rotates under the action of the gears G1 and G2 from one extreme to the other of one of the even numbered digital positions thereof, that is, P0, P2, . . ., P28, and P30, for each half revolution of the shaft 1′ over the range of digital positions P′0 to P′15. Consequently the shaft 1 rotates from one extreme to the other of one of the odd numbered digital positions thereof, that is, P1, P3, . . ., P29, and P31, for each half revolution of the shaft 1′ over the range of digital positions P′16 to P′31.

In this manner the combination of pulses appearing on the leads c1 to c5 and f1 to f4 provides an indication of the angular position of the shaft 1′ within any one of sixteen complete revolutions of that shaft. That part of this pulse combination which appears on the leads c1 to c5 indicates in which of the thirty-two half revolutions of these sixteen complete revolutions, the shaft 1′ is at that time positioned; and that part of this combination which appears on the leads f1 to f4 indicates the particular digital position of the digital positions P′0 to P′15 or P′16 to P′31, in which the shaft 1′ is in fact positioned within that indicated half revolution.

The alternating current signal applied to the winding 28 is controlled to be in anti-phase with the exciting signal while a pulse appears on the lead f5, but otherwise to be in-phase with that exciting signal. As follows from reference to FIGURE 4*b*, a pulse appears on the lead f5 only for positions of the shaft 1′ within the range of digital positions P′16 to P′31. Thus the signal applied to the winding 28 of the coder CD is in-phase with the exciting signal while the shaft 1′ of the coder FD occupies any of the digital positions P′0 to P′15, that is, while the shaft 1 occupies an even numbered digital position of the positions P0 to P31. On the other hand the signal applied to the winding 28 is in anti-phase with the exciting signal while the shaft 1' occupies any one of the digital positions P'16 to P'31, that is, while the shaft 1 occupies an odd numbered digital position of the positions P0 to P31.

While the signal applied to the winding 28 is in-phase with the exciting signal the magnetic field produced by the winding 28 where this winding is wound in the negative sense, is in the same direction as the magnetic field produced by the winding 14, but is in the opposite direction where the winding 28 is wound in the positive sense. Similarly, while the signal applied to the winding 28 is in anti-phase with the exciting signal the magnetic field produced by the winding 28 where this winding is wound in the negative sense, is in the opposite direction to that produced by the winding 14, but is in the same direction where the winding 28 is wound in the positive sense. The effect of the signal in the winding 28 in both cases, is to increase the angular ranges of sixteen of the thirty-two digital positions P0 to P31, and to decrease the angular ranges of the other sixteen. When the shaft 1' is within the range of digital positions P'0 to P'15 and the signal in the winding 28 is therefore in-phase with the exciting signal, there is an increase in the angular range of each of the even numbered digital positions P0, P2, . . ., P28, and P30, and a consequent decrease in the angular range of each of the odd numbered digital positions P1, P3, . . ., P29, and P31. In distinction to this, when the shaft 1' is within the range of digital positions P'16 to P'31 and the signal in the winding 28 is therefore in anti-phase with the exciting signal, there is an increase in the angular range of each of those odd numbered digital positions and a decrease in the angular range of each of those even numbered digital positions.

The manner in which the angular ranges of the digital positions P0 to P31 are increased and decreased with the application of an "in-phase" signal to the winding 28 is illustrated at *c* in FIGURE 6, and with the application of an "in anti-phase" signal at *d* of FIGURE 6.

As illustrated at *c* of FIGURE 6, the angular ranges of the even numbered digital positions P0, P2, . . ., P28, and P30, are each increased by an angle *p* on both sides of the corresponding teeth 8 during the application of the "in-phase" signal to the winding 28, whereas the angular ranges of the odd numbered ditigal positions P1, P3, . . ., and P31, are each decreased by the angle *p* on both sides of the corresponding teeth 8. At this time the shaft 1' is in one of the digital positions P'0 to P'15, so that the shaft 1 is then in one of the even numbered digital positions P0, P2, . . ., and P30.

For subsequent movement of the shaft 1' out of the range of digital positions P'0 to P'15 the phase of the signal applied to the winding 28 is reversed. In these circumstances, as illustrated at *d* of FIGURE 6, the angular ranges of the even numbered digital positions P0, P2, . . ., P28, and P30, are each decreased by the angle *p* on both sides of the corresponding teeth 8, whereas the angular ranges of the odd numbered digital positions P1, P3, . . ., P29, and P31, are each increased by the angle *p* on both sides of their corresponding teeth 8.

In order to further explain the operation of the arrangement of FIGURE 5 it will be assumed that the shaft 1 originally lies within the digital position P0 represented at *b* of FIGURE 6, and that therefore, the shaft 1' lies within the range of digital positions P'0 to P'15. The signal applied to the winding 28 at this time is such that the digital position P0 of the shaft 1 extends beyond the range of the digital position P0 when no such signal is applied to the winding 28 (compare *b* and *c* of FIGURE 6). If now the shaft 1' moves from the digital position P'15 to the position P'16, this movement from the range of digital positions P'0 to P'15 into the range of positions P'16 to P'31, results in a reversal of phase of the signal in the winding 28. This reversal of phase effectively causes the digital position occupied by the shaft 1 to change from P0 to P1, since the position occupied by the shaft 1 at this time lies within the digital position P0 before the reversal of phase but within the digital position P1 after that reversal.

The binary number represented by the pulses appearing on the leads *c1* to *c5* and *f1* to *f4* while the shaft 1' is in the digital position P'15 and the shaft 1 is in the digital position P0, is (from reference to FIGURES 4*a* and 4*b*):

0 0 0 0 0 1 0 0 0 the binary digits being arranged here (and also hereinafter) such that reading from left to right, those digits represent the presence ("1") or absence ("0"), as the case may be, of pulses on the leads *c5* to *c1* and *f4* to *f1* taken in that order.

On movement of the shaft 1' from the digital position P'15 to the digital position P'16, this binary number changes to:

0 0 0 0 1 1 0 0 0

The change from "0" to "1" of the binary digit in the fifth place of this binary number occurs exactly at the time when the shaft 1' moves from the digital position P'15 to the digital position P'16. The fact that the digit in the fifth place of the binary number changes exactly at the time when the shaft 1' moves from the digital position P'15 to P'16, ensures that the binary number provides an unambiguous indication of the position of the shaft 1' irrespective of imperfections (for example back-lash) in the gearing provided by the gears G1 and G2, and inaccuracies in the coder CD.

If no signal was applied to the winding 28 during operation, movement of the shaft 1' from the digital position P'15 to the digital position P'16 in the above case, would be accompanied, as before, by movement of the shaft 1 from the digital position P0 (as at *b* of FIGURE 6) to the position P1 (also as at *b* of FIGURE 6). However, owing for example to back-lash between the gears G1 and G2, the shaft 1 would be free to pass from the digital position P0 to the digital position P1 before or after the exact moment at which the shaft 1' moves between the digital positions P'15 and P'16. In this event therefore, the binary number representative of the pulses on the leads *c1* to *c5* and *f1* to *f4* could not be relied upon to provide a true indication of the position of the shaft 1'. For example, if in this case the shaft 1 passed from the digital position P0 to the digital position P1 before the shaft 1' had moved from the digital position P'15 to the digital position P'16, then the binary number obtained when the shaft 1 has moved to the digital position P1, but while the shaft 1' is still in the digital position P'15, would be:

0 0 0 0 1 1 0 0 0 that is, the binary number indicating, incorrectly, that the shaft 1' is in the digital position P'16. On the other hand, if the shaft 1 did not pass from the digital position P0 to the digital position P1 until after the shaft 1' had moved from the digital position P'15 to the digital position P'16, the binary number obtained when the shaft 1' has moved to the digital position P'16, but while the shaft 1 is still in the digital position P0, would be:

0 0 0 0 0 1 0 0 0 that is, the binary number indicating, incorrectly, that the shaft 1' is in the digital position P'15.

With the application of the exciting signal to the winding 28 as explained above, however, any possible ambiguity in the binary number is obviated as long as the back-lash of the gears G1 and G2 is not sufficient to allow the shaft 1 to move independently of the shaft 1' over an angular range as large as *p*. As will be apparent, the range *p* may be made as large as required up to a maximum of 5.625 degrees by suitable choice of the magnitude of current applied to the winding 28.

Although the error which may arise in the digital representation provided by the arrangement of FIGURE 1 if no signal is applied to the winding 28, has been explained above in relation to the back-lash between the gear wheels G1 and G2, there are other sources of such error. For example, errors may arise owing to other imperfections in the gearing between the shafts 1 and 1', and, also owing to inaccuracies in the coder CD itself. In this latter case the resulting error is due to the fact that even with particular care in the manufacture of the coder CD the angular ranges of the digital positions P0 to P31 may not be exactly 5.625 degrees as required. Furthermore, any small variation or other inconsistency in the operation of the output circuits OC may act to similarly affect these angular ranges.

Since even large changes in the angular position of the shaft 1' may result in only comparatively small changes in the angular position of the shaft 1, any small inaccuracies in the angular ranges of the digital positions P0 to P31 may result in comparatively large errors in the digital number represented. With the present arrangement all such possible errors in this digital number are obviated by suitable choice of the angular range *p*.

To continue with the example given above (in which the signal is applied to the winding 28 and the shaft 1 is rotated to the digital position P1 on rotation of the shaft 1' between the digital positions P'15 and P'16), the shaft 1 remains within the digital position P1 for rotation of the shaft 1' from the digital position P'16 to the digital position P'31. On further rotation of the shaft 1', in the same direction, from the digital position P'31 to the digital position P'0, the phase of the signal applied to the winding 28 is again reversed. As a result the prevailing system of digital positions of the shaft 1 changes from that illustrated at *d* in FIGURE 6 to that illustrated at *c*. The digital position of the shaft 1 is therefore changed from P1 to P2 simultaneously with the change from the digital position P'31 to the digital position P'0 of the shaft 1'.

If instead of being rotated in the direction to the digital position P'31 from the digital position P'16, the shaft 1' is rotated in the opposite direction back to the digital position P'15, the prevailing system of digital positions of the shaft 1 changes from that illustrated at *d* in FIGURE 6 to that illustrated at *c*. This change occurs simultaneously with the change from the digital position P'16 to the digital position P'15 of the shaft 1'.

From the above example it will be understood that for any rotation of the shaft 1' in either direction directly between the digital positions P'0 and P'31 or directly between the digital positions P'15 and P'16, there is a change in the digital position of the shaft 1. This change in digital position of the shaft 1 always takes place simultaneously with the change in digital position of the shaft 1'.

An example of the construction of the output circuits OC will now be described with reference to FIGURE 7, which in actual fact represents the circuit arrangement of that one of the output circuits OC which is connected to the lead 15 of the coder CD.

Referring to FIGURE 7, the lead 15 is connected directly to the base electrode of a P-N-P junction transistor T1 which is connected in an emitter-follower circuit configuration. The emitter load of the emitter-follower circuit is constituted by a resistor R1, and the emitter electrode is connected through a resistor R2 and a crystal diode D1 to the base electrode of a P-N-P junction transistor T2. A resistor R3 is connected between the base electrode of the transistor T2 and the negative pole of a current supply source (not shown).

The transistor T2 and a further P-N-P junction transistor T3 are connected in a so called long-tailed pair circuit configuration with a common emitter resistor R4. The collector electrode circuits of the transistors T2 and T3 include resistors R5 and R6 respectively, and the base electrode of the transistor T3 is connected to earth through a capacitor C1 and also to the positive pole of the current supply source through a resistor R7. A resistor R8 is connected between the base and collector electrodes of the transistor T3.

The collector electrodes of the transistors T2 and T3 are connected to the base electrodes of respective P-N-P junction transistors T4 and T5 through resistors R9 and R10 and crystal diodes D2 and D3.

The transistors T4 and T5 are connected in a well-known form of bistable trigger circuit, the output from this circuit being taken, by means of the lead *c*1, from the collector electrode of the transistor T5.

The lead SP (as connected to all the output circuits OC) is connected through a capacitor C2 and the diode D2 to the base electrode of the transistor T4, and through a capacitor C3 and the diode D3 to the base electrode of the transistor T5.

In operation, the alternating current which is induced into the winding 9 as described above is applied to the base electrode of the transistor T1 over the lead 15. Since the magnitude (and of course sense) of the inductive coupling between the winding 9 and the winding 14 varies according to the angular position of the yoke 5, the amplitude of the alternating current applied to the base electrode of the transistor T1 is dependent upon the angular position of the shaft 1.

If the amplitude of the alternating current applied to the base electrode of the transistor T1 is at any one time of relatively small amplitude, the transistor T1 and the diode D1 both remain conducting throughout the full cycle of this current. Thus the alternating current appearing on the lead 15 is effectively applied directly to the base electrode of the transistor T2.

If, however, the alternating current applied over the lead 15 is of relatively large amplitude, the transistor T1 is non-conducting for almost all the positive half-cycle of that current. During this period the diode D1 conducts and the base current of the transistor T2 is the difference between the current flowing in the resistors R1 and R2 on the one hand and the current flowing in the resistor R3 on the other hand. The diode D1 is non-conducting during the negative half-cycle of the alternating current applied to the base electrode of the transistor T1, so that during this period the base current of the transistor T2 is solely that which flows through the resistor R3. In this manner, the base current of the transistor T2 is restricted to within limits defined by the diode D1 and the values of the resistors R1, R2, and R3.

Assuming that the alternating current applied to the lead 15 is of sufficient amplitude, the transistor T2 is fully conducting during each negative half-cycle of that current, but is non-conducting during each positive half-cycle. In these circumstances therefore, under the normal limiting action of a long-tailed pair circuit, pulse waveforms of equal amplitude, but of opposite sense, appear at the collector electrodes of the transistors T2 and T3.

On the other hand if the amplitude of the alternating current is not sufficient to cause the transistor T2 to be alternately fully conducting and non-conducting, the waveform of this current is amplified to appear at the collector electrodes of the transistors T2 and T3 as waveforms of equal amplitude but of opposite sense. In these circumstances the circuit including the transistors T1, T2 and T3, acts in the manner of a linear amplifier. Variation in the value of the resistor R2 affects the gain of this amplifier.

The waveforms appearing at the collector electrodes of the transistors T2 and T3 due to the alternating current applied over the lead 15 (whether these are pulse waveforms or otherwise), are negative-going and positive-going respectively, during each positive half-cycle of that current, but are positive-going and negative-going respectively, during each negative half-cycle. The mean direct current level of these waveforms is maintained at five volts negative with respect to earth by means of the stabilising circuit provided by the resistors R7 and R8 together with the capacitor C1. In this stabilising circuit the resistor R8 provides direct current negative feedback between the collector and base electrodes of the transistor T3 to adjust the bias of the base electrode so as to maintain the direct current level at the collector electrode at five volts negative with respect to earth.

The fact that the direct current level of the collector electrode of the transistor T3 is maintained at five volts negative with respect to earth, ensures that the waveforms at the collector electrodes of the transistors T2 and T3 are respectively positive-going and negative-going about this stabilised level only during the negative half-cycles of the alternating current appearing on the lead 15, and negative-going and positive-going respectively only during the positive half-cycles. Further, the periods for which the transistors T2 and T3 are fully conducting while a relatively large amplitude alternating current appears on the lead 15, are maintained equal to the corresponding periods for which those transistors are non-conducting.

A positive-going sampling pulse is applied over the lead SP from the pulse shaping circuit PS, the same pulse being applied to each of the output circuits OC. This sampling pulse is derived by the pulse shaping circuit PS from one half-cycle of the exciting signal applied thereto by the source S. The pulse so derived is suitably delayed within the shaping circuit PS in order that the leading edge of the resulting sampling pulse applied over the lead SP, is coincident with the positive peak of the exciting signal as applied to the windings 14 and 14′ and the phase control circuit PC.

The application of the positive-going sampling pulse through the capacitors C2 and C3 causes the bistable trigger circuit including the transistors T4 and T5 to be set to one or the other of its two states in dependence upon the conducting conditions at that time of the two transistors T2 and T3. The potentials at the collector electrodes of the transistors T2 and T3 determine the resistances presented by the diodes D2 and D3 respectively, so that the amplitude of the sampling pulse as applied through the diode D2 to the base electrode of the transistor T4 is different from that as applied to the base electrode of the transistor T5 through the diode D3. If the potential of the collector electrode of the transistor T2 is more positive than that of the transistor T3, the amplitude of the sampling pulse as applied to the base electrode of the transistor T4 is greater than that as applied to the base electrode of the transistor T5. This causes the transistor T4 to become non-conducting if it is then conducting but to remain non-conducting if it is already in that state. If, on the other hand, the potential of the collector electrode of the transistor T3 is more positive than that of the transistor T2, the transistor T5, in a similar manner is rendered non-conducting if it is then conducting, but remains non-conducting if it is already in that state.

As a result therefore, the state of the bistable trigger circuit including the two transistors T4 and T5 provides an indication of whether the signal appearing on the lead 15 is an "in-phase" or an "in anti-phase" signal. If the signal appearing on the lead 15 is an "in-phase" signal, the transistors T4 and T5 are fully conducting and non-conducting, respectively, while if that signal is an "in anti-phase" signal the transistor T4 is non-conducting and the transistor T5 is fully conducting. Hence a negative-going pulse appears on the lead c1 only when, and for as long as, the signal on the lead 15 is in-phase with the exciting signal applied by the source S to the winding 14.

Negative-going pulses appearing on any of the output leads of the other eight output circuits OC similarly indicate that the alternating current signals applied to those circuits are in-phase with the exciting signal applied to the windings 14 and 14′ and the phase control circuit PC.

It will be appreciated that in the case of the output circuits OC connected to the leads 15′ to 19′, the signal applied to the input leads of those circuits may be of very small or even zero amplitude when the shaft 1′ is positioned near, or at, the transition between two adjacent digital positions of the digital positions P′0 to P′31. If the signal applied to the input lead of one of these output circuits is of zero amplitude, the potentials of the collector electrodes of the transistors which correspond to the transistors T2 and T3 in that output circuit are both five volts negative with respect to earth. The sampling pulse applied over the lead SP is as a result applied equally to the base electrodes of the two transistors which correspond to the transistors T4 and T5 in that output circuit. The bistable trigger circuit of that particular output circuit in these circumstances may either remain in its existing stable state or change to the other state. However, the particular one of the two states thereby adopted by that trigger circuit is of little consequence since the shaft 1′ is then at a transition between two adjacent digital positions of the digital positions P′0 to P′31. The important point is that the circuit does in actual fact adopt one of those states so that the combined output signals from the leads *f1* to *f5* provide a definite indication of the position of the shaft 1′.

The coding provided by the arrangement described above with reference to FIGURES 1 and 5 is illustrated in FIGURE 8. The signals which appear on the output leads *f1* and *f4* of the coder FD are illustrated at *a* of FIGURE 8 for one complete revolution of the shaft 1′, whereas the signals which appear on the output leads *c1* to *c5* of the coder CD are illustrated at *b* of FIGURE 8 for one complete revolution of the shaft 1, that is, for sixteen complete revolutions of the shaft 1′.

In both *a* and *b* of FIGURE 8 the presence of a pulse is represented by a full line, the sequence of pulses which appear on each of the leads *f1* to *f4* and *c1* to *c5* for one complete revolution of the shafts 1 and 1′ being arranged in columns against the corresponding digital positions P′0 to P′31 and P0 to P31. Thus the combination of pulses which appear on the output leads *f1* to *f4* and *c1* to *c5* for any particular digital position of the shaft 1′ and corresponding digital position of the shaft 1, is determined from FIGURE 8 by observing the presence or absence of a full line within the rows of *a* and *b* appropriate to those particular digital positions.

For example, consider the case in which the shaft 1′ is positioned within the digital position P′11 with the shaft 1 positioned within the digital position P8. From *a* of FIGURE 8 it will be observed that in these circumstances pulses appear on the leads *f2*, *f3*, and *f4* but not on the lead *f1*, and from *b* of FIGURE 8, that pulses appear on the leads *c3* and *c4* but not on the leads *c1*, *c2* and *c5*. Hence the position of the shaft 1′ in this example is represented by the binary number:

0 1 1 0 0 1 1 1 0

Comparison between each of *a* and *b* of FIGURE 8 and the arrangement of windings shown in FIGURES 4*a* and 4*b* indicates the manner in which the windings 9 to 13 and 9′ to 13′ of the coders CD and FD have been arranged to provide the particular coding illustrated in FIGURE 8.

Although in the arrangement described above with reference to FIGURE 5 the signal applied to the winding 28 is derived from the exciting signal by the phase control circuit PC under control of the induced signal in the winding 13′, it is not necessary that this should be so. Instead the signal induced in the winding 13′ may itself be applied, after amplification, to the winding 28, so that the output circuit OC connected to the winding 13′ and the phase control circuit PC may be replaced by a single amplifier connected directly between the windings 13′ and 28. This amplifier is required to effect an overall phase reversal so that the signal applied to the winding 28 is in-phase with the exciting signal as applied to the winding 14 while the signal induced in the winding 13′ is in anti-phase with that exciting signal, and vice versa.

The excitation of the windings 14, 14′ and 28 may be performed using pulses rather than alternating currents. In these circumstances pulses which are either "in-phase" or "in anti-phase" with the exciting pulses are induced in the windings 9 to 13 and 9′ to 13′. The induced pulses in the windings 9 to 13 and 9′ to 12′ may be used, preferably after amplification and re-shaping, as output pulses from the arrangement, and the pulse induced in the winding 13′ may itself be applied after amplification (with inversion) to the winding 28.

It will be appreciated that where pulse excitation is used several sets of intercoupled coders (such as the set of coders FD and CD of FIGURE 1) may all share the same control unit (comparable with the control unit CU of FIGURE 1) on a time division basis. The exciting pulse in these circumstances is applied in the several sets of coders in succession.

An alternative arrangement of coders to provide the same coding as the arrangement described above with reference to FIGURES 1 to 5 will now be described with reference to FIGURES 9 and 10. This alternative arrangement is somewhat similar to the arrangement of FIGURES 1 to 5, and the same references as are used in FIGURES 1 to 5 are used in FIGURES 9 and 10 for components which are the same in the two arrangements.

Referring to FIGURE 9, shafts 1A and 1B of two coders AD and BD respectively, are secured to the gear G1, the gear G1 engaging, as in the case of the arrangement shown in FIGURE 1, with the gear G2 secured to the shaft 1′ of the coder FD. Electrical connection is made between each of the coders AD and BD and a control unit CU′ by means of multi-lead cables M3 and M4, respectively. The coder FD is similarly connected to the control unit CU′ by means of the multi-lead cable M2.

The control unit CU′, like the control unit CU, has output leads f1 to f4 and c1 to c5. The form of the unit CU′ and the manner in which it is connected to the coders FD, AD, and BD will now be described with reference to FIGURE 10.

Referring to FIGURE 10, the coders AD and BD have respective sets of windings 9*a* to 14*a* and 9*b* to 14*b*. Connection is made to the windings 9*a* to 13*a* by respective leads 15*a* to 19*a* and a common lead 20*a*, and to the windings 9*b* to 13*b* by respective leads 15*b* to 19*b* and a common lead 20*b*. The windings 14*a* and 14*b* have respective pairs of leads 21*a* and 21*b*, respectively.

The basic construction of each of the coders AD and BD is the same as that of the coder CD described above with reference to FIGURES 2 and 3, the shaft 1A and 1B each corresponding to the shaft 1 of the coder CD. The only differences are that the windings 9*a* to 13*a* and 9*b* to 13*b* are both arranged in a manner (described later) which is different from that of the windings 9 to 13 in the coder CD, and no additional winding such as the winding 28 is provided in either of these coders. On the other hand, the windings 14*a* and 14*b* are both identical with the winding 14 of the coder CD.

Alternating current is applied by the source S to the winding 14′ of the coder FD as before, and also to the windings 14*a* between one of the leads 21*a* and earth, and to the winding 14*b* between one of the leads 21*b* and earth.

The leads 15*a* to 19*a* and 15*b* to 19*b* are connected in pairs to individual ones of a bank of five switches SW1 to SW5, the five outputs of these switches being connected to respective ones of five output circuits OC (of which only two are shown). The output leads of these five output circuits OC constitute the output leads c1 to c5.

The leads 15′ to 19′ of the coder FD are connected as before to five output circuits OC (of which only two are shown), the output leads of the output circuits OC connected to the leads 15′ to 18′ constituting the output leads f1 to f4. The output lead f5 of the output circuit OC connected to the lead 19′ is connected to the bank of switches SW1 to SW5.

The exciting signal, as before, is applied to the pulse shaping circuit PS, and the resulting sampling pulse from this circuit is applied to each of the ten output circuits OC over a lead SP. Thus, as before, each of the output circuits OC effectively compares the signal applied thereto with the sampling pulse, and a pulse appears on the output lead of that output circuit only if the input signal is in-phase with the exciting signal.

The bank of switches SW1 to SW5 is such, and the leads 15*a* to 19*a* and 15*b* to 19*b* are so connected in pairs to those switches, that, while there is no pulse on the lead f5, the leads 15*a* to 19*a* are connected directly to the output circuits OC of those respective switches SW1 to SW5. However, while there is a pulse on the lead f5 it is the leads 15*b* to 19*b* that are connected directly to these output circuits through those respective switches. In this manner therefore, the signals which appear on the leads c1 to c5 are dependent upon the phase relationship, in-phase or in anti-phase, between the exciting signal and the signals appearing in the respective windings 9*a* to 15*a* while no pulse appears on the lead f5. However, while a pulse appears on the lead f5, the signals appearing on the leads c1 to c5 are dependent upon this phase relationship for the signals appearing in the windings 9*b* to 15*b*, respectively.

The windings 15*a* to 19*a* and 15*b* to 19*b* are arranged within the coders AD and BD respectively, to provide a coding which ensures that the combinations of pulses which appear on the leads c1 to c5 change only at the instant when there is a change in the signal appearing on the lead f5, that is, at the instant when the shaft 1′ moves between the range of digital position P′0 to p′15 and the range of digital positions P′16 to p′31.

Referring to FIGURE 11, the coding provided by the coder AD is shown at *a*, and that provided by the coder BD at *b*. The sequence of "in-phase" and "in anti-phase" signals which are induced in the windings 9*a* to 13*a* and 9*b* to 13*b*, and therefore which appear on the leads 15*a* to 19*a* and 15*b* to 19*b*, for one complete revolution of the shafts 1A and 1B are indicated in columns against the corresponding digital positions P0 to P31. The full lines in each column represent the presence of an "in-phase" signal, and the absence of such lines an "in anti-phase" signal. Thus the combination of "in-phase" and "in anti-phase" signals which appear in the windings 9*a* to 13*a* and 9*b* to 13*b* for any particular digital position of the shaft 1′ within sixteen complete revolutions of that shaft, is indicated by observing the presence or absence of a full line within the rows of *a* and *b* appropriate to that particular position of the shaft 1′.

The action of the switches SW1 to SW5 under the control of the signal appearing on the lead f5, is, as indicated above, such that the combination of pulses appearing on the leads c1 to c5 is derived from the signals appearing in the windings 9*a* to 13*a* while the shaft 1′ is within the range of digital positions P′0 to P′15, but derived from the signals appearing in the windings 9*b* to 13*b* while the shaft 1′ is within the range of digital positions P′16 to P′31. Thus for rotation of the shaft 1′ over sixteen revolutions, the particular set of signals which are applied through the switches SW1 to SW5 to determine the output pulse combination on the leads c1 to c5 alternates between that at *a* that at *b*.

The identity of the particular set of signals applied through the switches SW1 to SW5 for any position of the shaft 1′, whether the set (in the row appropriate to that position) as shown at *a* or that as shown at *b*, is indicated at *c* of FIGURE 11. At *c*, the letter *a* in the row corresponding to any one of the digital positions P0 to P31 indicates that the signals applied through the switches SW1 to SW5 for that position are those from the coder AD, whereas the letter *b* indicates that the signals applied through the switches SW1 to SW5 are those from the coder BD. However it should be appreciated that it is the signal upon the lead *f5* which controls the switching from one to the other of the coders AD and BD, and that this change may not be simultaneous with the transition between adjacent ones of the indicated digital positions P0 to P31, due for example, to back-lash between the gears G1 and G2.

From *a* and *b* of FIGURE 11 it will be observed that the changes in phase of the signals appearing in the windings 9*a* to 13*a* and 9*b* to 13*b* occur half-way through the angular ranges of the digital positions P0 to P31. The changes in phase of the signals appearing in the windings 9*a* to 13*a* occur only while the signals from the windings 9*b* to 13*b* are applied through the switches SW1 to SW5. Similarly, the changes in phase of the signals in the windings 9*b* to 13*b* occur only while the signals from the windings 9*a* to 13*a* are applied through the switches SW1 to SW5. In this manner therefore, the change in phase of the signal appearing on any one of the leads 9*a* to 13*a* and 9*b* to 13*b* occurs only while that signal is not itself being applied through the bank of switches SW1 to SW5.

Since the signals appearing on the leads 9*a* to 13*a* and 9*b* to 13*b* change half-way through a digital position, the shafts 1A and 1B may be rotated by as much as 5.625 degrees in either direction beyond the transition from one to the other of the indicated digital positions P0 to P31 without a change taking place in the output signals appearing on the leads *c*1 to *c*5. Thus it will be seen that the arrangement of the two coders AD and BD is effective to provide the two systems of digital positions P0 to P31 as shown at *c* and *d* of FIGURE 6, in this case the system shown at *c* of FIGURE 6 prevailing while no pulse appears on the lead *f5* and that at *d* while a pulse does appear on the lead *f5*. The value of *p* in the present case is of course ½(5.6.25) degrees. Further, the resultant digital coding provided by the present arrangement is exactly the same as that represented in FIGURE 8.

The manner in which the windings 9*a* to 13*a* and 9*b* to 13*b* are arranged in the coder AD and BD will be apparent from *a* and *b* respectively, of FIGURE 11. The windings 9*a* and 9*b* are each wound round pairs of teeth corresponding to the teeth 8; the windings 10*a* and 10*b* are each wound round groups of four of the teeth; the windings 11*a* and 11*b* are each wound round groups of eight of the teeth; and the windings 12*a*, 12*b*, 13*a* and 13*b* are each wound round groups of sixteen teeth. However in contrast to the arrangement of windings 9 to 13 shown in FIGURES 4*a* and 4*b*, the grouping of the windings 9*a* to 13*a* and of the windings 9*b* to 13*b* is such that the senses of two of the windings in each of the coders AD and BD change between alternate pairs of adjacent teeth. Further, the shafts 1A and 1B are so coupled to the gear G2 that the transition from one to the other of the digital positions P0 to P31 within the coders AD and BD takes place while the yokes (which correspond to the yoke 5) of those coders each lie directly over one of the teeth (which correspond to the teeth 8). Thus in this case the digital positions P0 to P31 are not directly related to the digital positions of the shafts 1A and 1B as these would appear from the signals appearing in the windings 9*a* to 13*a* and 9*b* to 13*b* of the coders AD and BD alone, but result from the particular combination of the coders AD and BD.

The arrangement of the windings 9*a* to 13*a* and 9*b* to 13*b* in the coders AD and BD to provide the separate codings indicated at *a* and *b* of FIGURE 11, really only requires that there shall be sixteen teeth in each of the coders AD and BD. However if the full number of thirty-two teeth is provided it is then a simple matter to increase the range of digital coding of the shaft 1′ from sixteen to thirty-two revolutions. All that is required is to increase the gear ratio between the gears G1 and G2 from 16:1 to 32:1, and then suitably extend, and add another winding to, each set of windings in the coders AD and BD. In this latter case there is sixty-four digital positions of the shafts 1A and 1B each of which extends over 5.625 degrees, that is, over half the angular range of the digital positions P0 to P31.

In addition, the windings 9*a* to 13*a* and 9*b* to 13*b* may all be provided in one coder instead of in two as shown in FIGURES 9 and 10. This latter coder acts in exactly the same manner as the two coders AD and BD shown in FIGURE 10 and the switching from one to the other of the two sets of windings 9*a* to 13*a* and 9*b* to 13*b* is, as before, under the control of the signal appearing on the lead *f5*.

In the coders AD and BD are replaced in the above manner by a single coder having the two sets of windings 9*a* to 13*a* and 9*b* to 13*b* is of course necessary to provide only one exciting winding, such as the winding 14, within that coder.

It will be appreciated that in general if it is required to provide a digital representation of the angular position of the shaft 1′ over more than sixteen revolutions, one or more further coders which are the same as the coder CD may be coupled to the shaft 1′. For example, in a case where it is desired to provide a digital representation of the angular position of that shaft over two hundred and fifty-six complete revolutions, the shaft of a further coder the same as the coder CD, is coupled to the shaft 1 through a gear train having a reduction ratio of 16:1. The reduction gear ratio between the shaft of this further coder and the shaft 1′ is therefore 256:1, and it is arranged that the further coder is operated so that there is a change in the digits represented by the output from that coder only for a change in the most significant digit represented by the coder CD.

Although the arrangement shown in FIGURES 1 and 5 has been described as providing the particular nine digit binary coding shown in FIGURE 8, it will be appreciated that other codings are possible by suitable arrangement of the windings 9 to 13 and 9′ to 13′ in the coders CD and FD. In addition it will be appreciated that the number of teeth 8 in the coder CD and that of the corresponding teeth in the coder FD, are, in general, dictated by the particular coding used.

The alternative binary coding provided by the arrangement of FIGURE 1 might be, for example, a nine digit cyclic binary coded cyclic decimal coding. In this latter case each complete revolution of each of the shafts 1 and 1′ is in effect divided into twenty digital positions of equal angular range, so that it is necessary to provide only twenty teeth corresponding to the teeth 8 in each of the coders CD and FD.

One suitable form of nine digit cyclic binary coded decimal coding is shown at *a* and *b* of FIGURE 12. In FIGURE 12 the sequence of pulses which appear, with this coding, upon the leads *f*1 to *f*4 for rotation of the shaft 1′ over one complete revolution through twenty digital positions Q′0 to Q′19, is shown at *a*, and that which appears upon the leads *c*1 to *c*5 over one complete revolution of the shaft 1 through twenty digital positions Q0 to Q19, is shown at *b*. The presence of a pulse on any one of the leads *f*1 to *f*4 and *c*1 to *c*5 is shown (as in the case of FIGURE 8) by a full line in FIGURE 12, and the arrangement of the windings 9′ to 12′ and 9 to 13 in this case, is clear from this figure. It will be appreciated also that in this case the winding 13′ changes sense between the digital positions Q′9 and Q′10 and between the digital positions Q′19 and Q′0.

Similarly, the arrangement shown in FIGURES 9 and 10 may be arranged to provide other binary codings. If for example, it is desired to provide the binary coding shown in FIGURE 12, the windings 9*a* to 13*a* of the coder AD are required to provide the sequence of signals shown at *a* of FIGURE 13, and the windings 9*b* to 13*b* of the coder BD the sequence shown at *b*. As in the case of FIGURE 11, the identity of the set of signals *a* or *b*, at any one time applied to the switches SW1 to SW5 is indicated at *c* of FIGURE 13.

I claim:

1. An arrangement comprising: a first shaft-position encoder having an input shaft and arranged to provide $(N+1)$ binary electric signals that are characteristic of the angular position of the input shaft within one revolution, where N is an integer greater than unity; a second shaft-position encoder having an input shaft and arranged to provide M binary electric signals that are characteristic of the angular position of its respective input shaft within one revolution, where M, which may be equal to N, is an integer greater than unity, the second encoder including main and auxiliary primary windings, M secondary windings, and a ferromagnetic member that is mounted on the respective input shaft to be positioned relative to the secondary windings in dependence upon the angular position of the last said input shaft, and to inductively link portions of the secondary windings to the primary windings so that the sense of the inductive coupling between each said secondary winding and each said primary winding is dependent upon the angular position of the last said input shaft; signal supply means to supply an electric signal of varying amplitude to said main primary winding; means responsive to the most significant signal of said $(N+1)$ binary signals to supply to said auxiliary primary winding an electric signal of varying amplitude that is in phase with the signal supplied by said signal supply means only when said most significant signal has one of its binary values and is in anti-phase with the signal supplied by said signal supply means only when said most significant signal has the other binary value; and reduction gearing mechanically coupling the input shaft of the second encoder to the input shaft of the first encoder; the arrangement being such that the M output signals from the second encoder and the N lesser significant output signals from the first encoder are respectively representative according to a code of the M more significant and the N lesser significant digits of an $(M+N)$ digit binary number that is characteristic of the angular position of the input shaft of said first encoder within a plurality of revolutions of that shaft.

2. An arrangement for providing a representation according to a $(M+N)$ digit binary code of the relative position of a pair of members, where M and N, which may be equal, are both integers greater than unity, comprising: a first electrical position-encoder for supplying $(N+1)$ binary output electric signals that are dependent upon said relative position; second and third electrical position-encoders each of which is arranged to supply M binary output electric signals that are dependent upon said relative position, the second and third position-encoders each comprising a main primary winding connected to be excited by an electric signal of varying amplitude, M secondary windings, and a ferromagnetic member for inductively linking the secondary windings to the primary winding and arranged to be positioned relative to the secondary windings in dependence upon the relative position of said pair of members so that the particular one of the two phase relationships, in phase and in anti-phase, which exists between a signal induced in any said secondary winding and the exciting signal applied to the primary winding is dependent upon the position of the ferromagnetic member relative to that secondary winding; and switch means responsive to the most significant signal of the $(N+1)$ binary signals supplied by said first position-encoder to select the signals induced in the M secondary windings of the second position-encoder only when said most significant signal has one of its binary values and to select the signals induced in the M secondary windings of the third position-encoder only when said most significant signal has the other value; the arrangement being such that the M signals selected by the switch means and the N lesser significant of the $(N+1)$ output signals of said first position-encoder are together representative of said relative position according to said code.

3. An arrangement comprising: a first shaft position encoder having an input shaft and arranged to provide $(N+1)$ binary electric signals that are characteristic of the angular position of the input shaft within one revolution where N is an integer greater than unity; second and third shaft position encoders each having an input shaft and being arranged to provide M binary electric signals that are characteristic of the angular position of its respective input shaft within one revolution, where M, which may be equal to N, is an integer greater than unity, the second and third encoders each including a primary winding, M secondary windings, and a ferromagnetic member mounted on the relevant input shaft to be positioned relative to the secondary windings in dependence upon the angular position of the last said input shaft, and to inductively link portions of the second windings to the primary winding so that the sense of the inductive coupling between each secondary winding and the primary winding is dependent upon the angular position of the last said input shaft; means to supply an electric signal of varying amplitude to the primary winding of the second and third encoders; switch means responsive to the most significant signal of said $(N+1)$ output signals to select signals induced in the secondary windings of said second encoder only when said most significant signal has one of its binary values and to select signals induced in the secondary windings of said third encoder only when said most significant signal has the other binary value; and reduction gearing mechanically coupling the input shafts of the second and third encoders to the input shaft of the first encoder; the arrangement being such that the M output signals selected by the switch means and the N lesser significant output signals from the first encoder are respectively representative according to a code of the M more significant and the N lesser significant digits of an $(M+N)$ digit binary number that is characteristic of the angular position of the input shaft of said first encoder within a plurality of revolutions of that shaft.

4. An arrangement for providing a digital representation of the relative position of a pair of members, comprising: a first electrical position-encoder for supplying a plurality of binary electric signals that are dependent upon said relative position; a second electrical position-encoder for supplying a plurality of binary electric signals that are dependent upon said relative position, the second position-encoder comprising a series of spaced ferromagnetic elements, a main primary electrical winding electromagnetically coupled to said elements all in the same sense, an auxiliary primary electrical winding electromagnetically coupled in opposite senses to successive ones of said elements, a plurality of secondary electrical windings each of which embraces at least one group of said elements all in the same sense, the grouping of said elements by the different secondary windings being different, a ferromagnetic yoke for enhancing inductive coupling between the primary and secondary windings at any said element, and means mounting the ferromagnetic yoke for movement from one to another of said elements in turn in accordance with movement between said pair of members so that the element at which the inductive coupling is enhanced as aforesaid is dependent upon the relative position of said pair of members; means to supply an electric signal of varying amplitude to excite the main primary winding; and means responsive to a predetermined one of said binary output signals supplied by said first position-encoder to supply an electric signal of varying amplitude to excite the auxiliary primary winding in-phase with the excitation of the main primary winding when said predetermined signal has a first value and to excite the auxiliary primary winding in anti-phase with the excitation of the main primary winding when said predetermined signal has a second value.

5. An arrangement comprising: a first shaft-position encoder having an input shaft and arranged to provide $(N+1)$ binary electric signals that are characteristic of the angular position of the input shaft within one revolution, where N is an integer greater than unity; a second shaft-position encoder having an input shaft and arranged to provide M binary electric signals that are characteristic of the angular position of its respective input shaft within one revolution, where M, which may be equal to N, is an integer greater than unity, the second encoder including a series of spaced ferromagnetic elements, a main primary electrical winding electromagnetically coupled to said elements all in the same sense, an auxiliary primary electrical winding electromagnetically coupled in opposite senses to successive ones of said elements, M secondary electrical windings each of which embraces consecutive groups of said elements in opposite senses, the groupings of said elements by the different secondary windings being different, a ferromagnetic yoke for enhancing inductive coupling between the primary and secondary windings at any said element, and means mounting the ferromagnetic yoke on the input shaft of the second encoder for movement from one to another of said elements in turn in accordance with rotation of the latter input shaft so that the element at which the inductive coupling is enhanced as aforesaid is dependent upon the angular position of said latter input shaft; means to excite the main primary winding with an electric signal of varying amplitude; and means responsive to the most significant of said $(N+1)$ binary output signals to supply an electric signal of varying amplitude to excite the auxiliary primary winding in-phase with the excitation of the main primary winding when said predetermined signal has a first value and to excite the auxiliary primary winding in anti-phase with the excitation of the main primary winding when said predetermined signal has a second value.

6. An arrangement comprising: an electrical position encoder that comprises a stator having a series of spaced ferromagnetic elements thereon, a main primary electrical winding on said stator and electromagnetically coupled to said elements all in the same sense, an auxiliary primary electrical winding on said stator and electromagnetically coupled in opposite senses to successive ones of said elements, a plurality of secondary electrical windings each of which embraces consecutive groups of said elements in opposite senses, the grouping of said elements by the different secondary windings being different, an input shaft mounted for rotation with respect to said stator, and a ferromagnetic yoke which enhances inductive coupling between the primary and secondary windings at any said element and which is mounted on said input shaft for movement from one to another of said elements in turn in accordance with rotation of the input shaft so that the element at which the inductive coupling is enhanced as aforesaid is dependent upon the angular position of said input shaft; means to excite the main primary winding with an electric signal of varying amplitude; means for supplying a control signal having selectively either of first and second values in dependence upon the value of an input variable; and means responsive to said control signal to supply an electric signal of varying amplitude to excite the auxiliary primary winding in-phase with the excitation of the main primary winding when said control signal has said first value and to excite the auxiliary primary winding in anti-phase with the excitation of the main primary winding when said control signal has said second value.

7. An arrangement for providing an $(M+N)$-digit representation of the angular position of a shaft, where M and N, which may be equal, are both integers greater than unity, comprising: a first electrical shaft-position encoder to provide an $(N+1)$-digit fine representation of said angular position; reduction gearing; second and third electrical shaft-position encoders which are substantially the same as one another and which have input shafts thereof coupled through said reduction gearing to said shaft with a predetermined angular displacement between said input shafts to provide respective M-digit coarse representations of said angular position; switch means responsive to the most significant digit of said fine representation to select the M-digit coarse representation supplied by said second encoder when said most significant digit has a first value and to select the M-digit coarse representation supplied by said third encoder when said most significant digit has a second value, so that the M-digit coarse representation which is selected and the N lesser significant digits of the fine representation together provide said $(M+N)$-digit representation.

References Cited by the Examiner

UNITED STATES PATENTS

| | | | |
|---|---|---|---|
| 2,866,506 | 12/58 | Hierath | 340—172.5 |
| 3,066,286 | 11/62 | Wright | 340—347 |

OTHER REFERENCES

Pages 6–01 to 6–31, copyright 1961. Handbook of Automation, Computation and Control, vol. 3, chapter 6 titled "Numerical Control of Machines" by Grabbe, Ramo and Wooldridge.

MALCOLM A. MORRISON, *Primary Examiner.*

EVERETT R. REYNOLDS, IRVING L. SRAGOW, *Examiners.*